(12) United States Patent
Kim

(10) Patent No.: US 12,337,759 B2
(45) Date of Patent: Jun. 24, 2025

(54) SIDE MIRROR AND VEHICLE HAVING THE SAME

(71) Applicants: HYUNDAI MOTOR COMPANY, Seoul (KR); KIA CORPORATION, Seoul (KR)

(72) Inventor: Minhan Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 76 days.

(21) Appl. No.: 18/210,938

(22) Filed: Jun. 16, 2023

(65) Prior Publication Data

US 2024/0083360 A1 Mar. 14, 2024

(30) Foreign Application Priority Data

Sep. 13, 2022 (KR) .................. 10-2022-0114662

(51) Int. Cl.
| | |
|---|---|
| *H04N 7/18* | (2006.01) |
| *B60R 1/12* | (2006.01) |
| *B60R 1/23* | (2022.01) |
| *G02B 5/32* | (2006.01) |
| *G02B 17/02* | (2006.01) |
| *G02B 30/10* | (2020.01) |
| *G02B 30/27* | (2020.01) |

(Continued)

(52) U.S. Cl.
CPC ............. *B60R 1/23* (2022.01); *B60R 1/12* (2013.01); *G02B 5/32* (2013.01); *G02B 17/02* (2013.01); *G02B 30/10* (2020.01); *G02B 30/27* (2020.01); *G02B 30/33* (2020.01); *G02B 30/56* (2020.01); *H04N 7/181* (2013.01); *H04N 13/239* (2018.05); *H04N 13/305* (2018.05); *H04N 13/32* (2018.05); *H04N 13/363* (2018.05); *B60R 2001/1253* (2013.01); *B60R 2300/105* (2013.01); *B60R 2300/20* (2013.01); *B60R 2300/30* (2013.01)

(58) Field of Classification Search
CPC .... B60R 1/00; B60R 1/12; B60R 1/23; B60R 2001/1215; B60R 2001/1253; B60R 2300/105; B60R 2300/20; B60R 2300/30
See application file for complete search history.

(56) References Cited

U.S. PATENT DOCUMENTS

| | | | | |
|---|---|---|---|---|
| 2009/0284598 A1* | 11/2009 | Busch | ............ | B60R 1/28 348/148 |
| 2018/0162274 A1* | 6/2018 | Kim | ............ | B60R 1/26 |
| 2020/0317213 A1* | 10/2020 | Oba | ............ | B60K 35/22 |

FOREIGN PATENT DOCUMENTS

DE 102021005083 A1 * 12/2021

OTHER PUBLICATIONS

Jin-Ho Lee et al. "Automotive augmented reality 3D head-up display based on light-field rendering with eye-tracking" vol. 28, No. 20/Sep. 28, 2020/ Optics Express 29788.

* cited by examiner

Primary Examiner — Md N Haque
(74) Attorney, Agent, or Firm — Morgan, Lewis & Bockius LLP

(57) ABSTRACT

The disclosure relates to a side mirror for recognition of left and right rear environment of a vehicle and the vehicle having the same.
The side mirror includes: a camera provided on an exterior of a vehicle and configured to obtain an image of a rear environment; and a monitor provided inside the vehicle and configured to display the image obtained by the camera. The image displayed on the monitor has a focal length greater than a distance to a surface of the monitor from a user's location.

18 Claims, 21 Drawing Sheets

(51) Int. Cl.
    *G02B 30/33*     (2020.01)
    *G02B 30/56*     (2020.01)
    *H04N 13/239*    (2018.01)
    *H04N 13/305*    (2018.01)
    *H04N 13/32*     (2018.01)
    *H04N 13/363*    (2018.01)

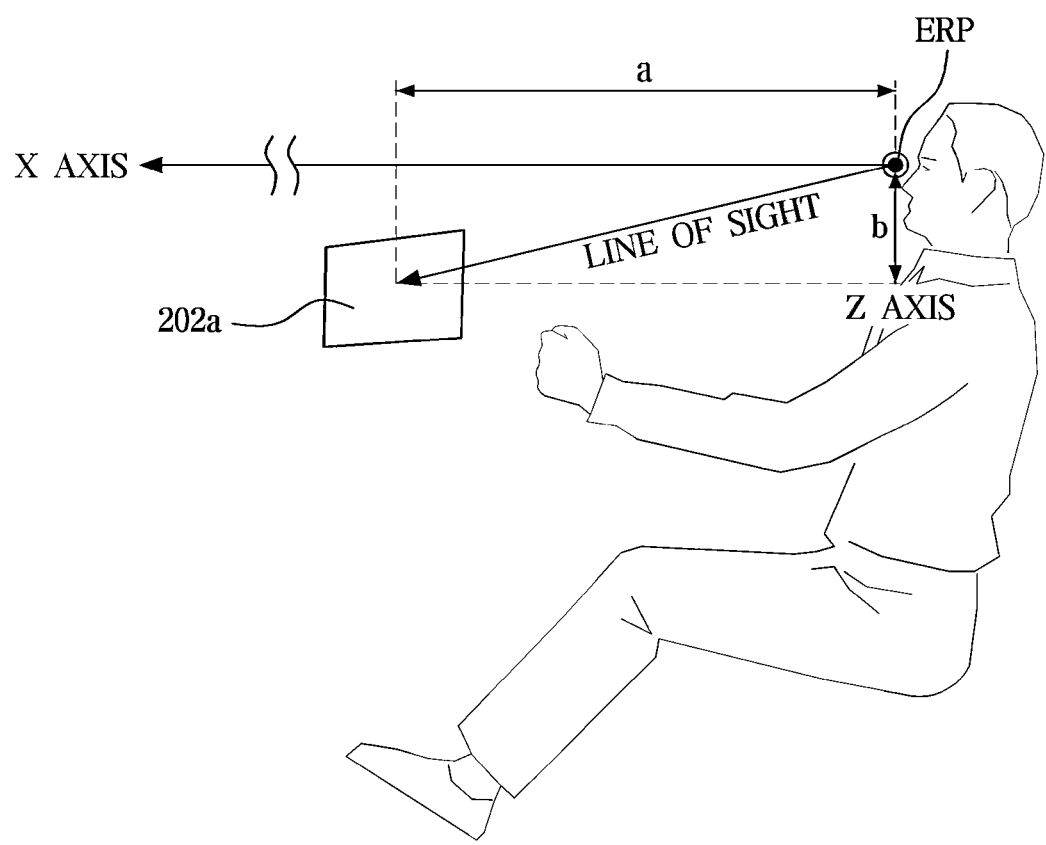

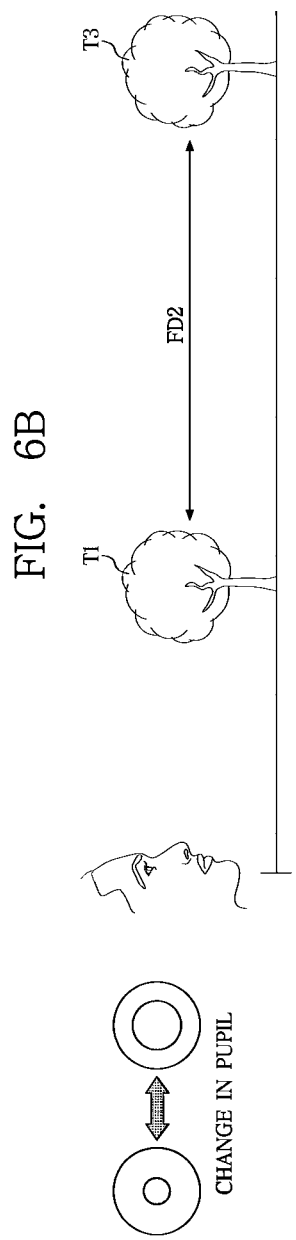

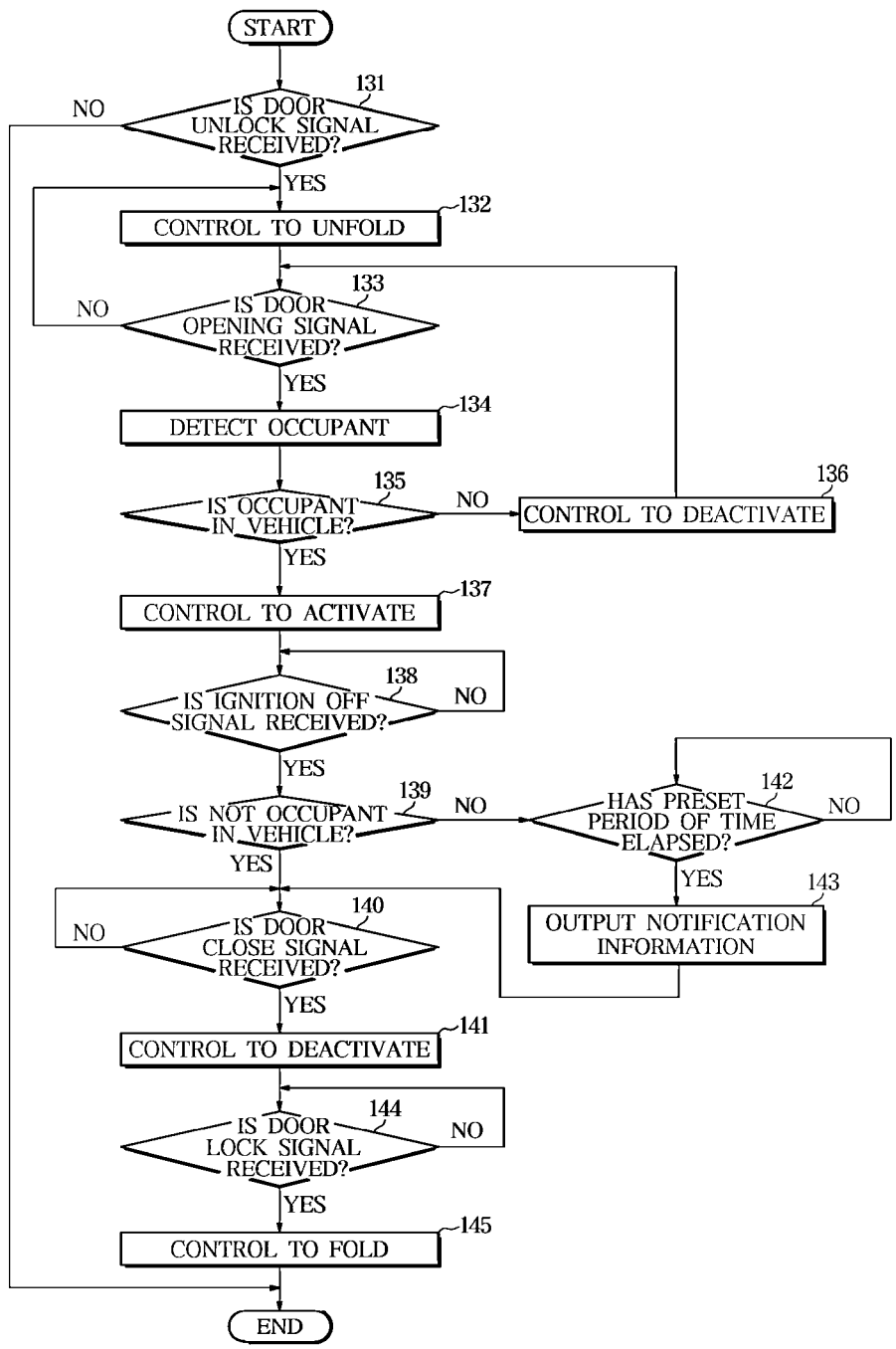

SIDE MIRROR AND VEHICLE HAVING THE SAME

CROSS-REFERENCE TO RELATED APPLICATION

This application is based on and claims the benefit of priority to Korean Patent Application No. 10-2022-0114662, filed on Sep. 13, 2022 in the Korean Intellectual Property Office, the disclosure of which is incorporated herein by reference.

TECHNICAL FIELD

The disclosure relates to a side mirror and a vehicle having the same that may improve user's recognition of an environment behind the vehicle.

BACKGROUND

A vehicle includes a side mirror for helping a driver to see a rear view of the vehicle.

A side mirror is protruded from the front left and right doors of a vehicle by a predetermined length. The side mirrors may be folded or unfolded manually or automatically for prevention of damage to side mirrors. Also, in order to secure a driver's rear view, the side mirrors may be manually or automatically rotated in a pan direction (left and right) or a tilt direction (up and down).

Recently, a digital side mirror capable of obtaining a rear view using a camera has been developed with the development of camera technologies.

In driving a vehicle equipped with the digital side mirror, when a user looks at a front view and then at a side mirror monitor, or looks at the side mirror monitor and then at the front view, a time taken to recover a pupil's focus is delayed due to a change in focal length of the user's field of view, leading to a safety issue caused by a momentary cognitive decline.

Also, when a digital side mirror is mounted on a vehicle, a side mirror monitor is required to be installed by considering its angle to prevent light from glimmering, and to prevent glare or reflection of light, causing a limited position of side mirror monitor and limited design freedom.

SUMMARY

An aspect of the disclosure provides a side mirror that may display a two-dimensional (2D) image having a focal length greater than a distance to a surface of a monitor, and a vehicle having the same.

Another aspect of the disclosure provides a side mirror that may display a three-dimensional (3D) image having a focal length greater than a distance to a surface of a monitor, and a vehicle having the same.

Additional aspects of the disclosure will be set forth in part in the description which follows and, in part, will be obvious from the description, or may be learned by practice of the disclosure.

According to an aspect of the disclosure, there is provided a side mirror, including: a camera provided on an exterior of a vehicle and configured to obtain an image of a rear environment; and a monitor provided inside the vehicle and configured to display the image obtained by the camera. According to an aspect of the disclosure, the image displayed on the monitor has a focal length greater than a distance to a surface of the monitor from a user's location.

According to an aspect of the disclosure, the monitor includes: a housing provided inside the vehicle; an image source configured to output an image light of the image obtained by the camera; a first mirror configured to refract and reflect an incident image light, based on the image light output from the image source being incident; a second mirror on which the image light reflected from the first mirror is incident and configured to expand and reflect the incident image light; a glass panel configured to project the image light reflected from the second mirror; and a coating part provided on one side of the glass panel and configured to prevent optical interference.

According to an aspect of the disclosure, the image source is configured to output a two-dimensional (2D) image or a three-dimensional (3D) image.

According to an aspect of the disclosure, the image obtained by the camera is a 3D image. According to an aspect of the disclosure, the image source of the monitor includes a light field display. According to an aspect of the disclosure, the light field display includes a color filter configured to output the 3D image obtained by the camera, and an optical member configured to separate the 3D image output from the color filter into a left eye image light and a right eye image light and output in different directions.

According to an aspect of the disclosure, the optical member includes at least one of a barrier, a lenticular lens, a microlens array, a grating or a pinhole.

According to an aspect of the disclosure, the image source includes a hologram display. According to an aspect of the disclosure, the hologram display includes a multi-directional backlight units (MDBUs), a liquid crystal display (LCD) panel, a holographic functional screen (HFS), and a lenticular lens array (LLA).

According to an aspect of the disclosure, the image obtained by the camera is a 3D image. According to an aspect of the disclosure, the image source includes a floating display. According to an aspect of the disclosure, the floating display includes a display configured to output the 3D image obtained by the camera, a first HoloLens configured to adjust a light path of a left eye image of the 3D image, and a second HoloLens configured to adjust a light path of a right eye image of the 3D image.

According to an aspect of the disclosure, the monitor of the side mirror includes: a housing provided inside the vehicle; an image source configured to output an image light of the image obtained by the camera; an optical member configured to reflect the image light output from the image source inside, and then output to an outside; and a coating part provided on one side of the optical member and configured to prevent optical interference.

According to an aspect of the disclosure, the image obtained by the camera is a 3D image. According to an aspect of the disclosure, the image source is one of a light field display, a hologram display or a floating display.

According to an aspect of the disclosure, the image obtained by the camera is a 3D image. According to an aspect of the disclosure, the monitor of the side mirror includes: an image source configured to output a left eye image light and a right eye image light of the image obtained by the camera; a waveguide plate including a first HoloLens configured to adjust a light path of the left eye image light, and a second HoloLens configured to adjust a light path of the right eye image light; and a coating part provided on one side of the waveguide plate and configured to prevent optical interference.

According to another aspect of the disclosure, there is provided a vehicle including: a first camera configured to obtain a first image of a rear left environment; a first monitor configured to display the first image obtained by the first camera; a second camera configured to obtain a second image of a rear right environment; and a second monitor configured to display the second image obtained by the second camera. According to another aspect of the disclosure, the first image displayed on the first monitor has a focal length greater than a distance to a surface of the first monitor from a user's location, and the second image displayed on the second monitor has a focal length greater than a distance to a surface of the second monitor from the user's location.

According to another aspect of the disclosure, the first monitor is provided inside a first A pillar provided on a left interior of the vehicle. According to another aspect of the disclosure, the second monitor is provided inside a second A pillar provided on a right interior of the vehicle.

According to another aspect of the disclosure, the first monitor includes: a housing provided inside the vehicle; an image source provided inside the housing and configured to output an image light of the first image obtained by the first camera; a first mirror provided inside the housing and configured to refract and reflect an incident image light, based on the image light output from the image source being incident; a second mirror on which the image light reflected from the first mirror is incident and configured to expand and reflect the incident image light, the second mirror being provided inside the housing; a glass panel provided outside the housing and configured to project the image light reflected from the second mirror; and a coating part provided on one side of the glass panel and inside the housing and configured to prevent optical interference.

According to another aspect of the disclosure, the first image obtained by the first camera is a 3D image. According to another aspect of the disclosure, the first monitor includes one of a light field display, a hologram display or a floating display.

According to another aspect of the disclosure, the first monitor includes: a housing provided inside the vehicle; an image source configured to output an image light of the first image obtained by the first camera; an optical member configured to reflect the image light output from the image source inside, and then output to an outside; and a coating part provided on one side of the optical member and configured to prevent optical interference.

According to another aspect of the disclosure, the image obtained by the first camera is a 3D image. According to another aspect of the disclosure, the first monitor includes: an image source configured to output a left eye image light and a right eye image light of the 3D image obtained by the first camera, a waveguide plate including a first HoloLens configured to adjust a light path of the left eye image light, and a second HoloLens configured to adjust a light path of the right eye image light; and a coating part provided on one side of the waveguide plate and configured to prevent optical interference.

According to still another aspect of the disclosure, there is provided a vehicle including: a first camera provided outside the vehicle and configured to obtain a first image of a rear left environment; a first monitor provided inside the vehicle and configured to display the first image obtained by the first camera; a second camera provided outside the vehicle and configured to obtain a second image of a rear right environment of the vehicle; and a second monitor provided inside the vehicle and configured to display the second image obtained by the second camera. According to still another aspect of the disclosure, the first image displayed on the first monitor has a focal length greater than a distance to a surface of the first monitor from a user's location. According to still another aspect of the disclosure, the second image displayed on the second monitor has a focal length greater than a distance to a surface of the second monitor from the user's location.

According to still another aspect of the disclosure, each of the first monitor and the second monitor includes: a housing, an image source provided inside the housing and configured to output an image light of the first image obtained by the first camera or the second image obtained by the second camera; a first mirror provided inside the housing and configured to refract and reflect an incident image light, based on the image light output from the image source being incident; a second mirror on which the image light reflected from the first mirror is incident and configured to expand and reflect the incident image light, the second mirror being provided inside the housing; a glass panel provided outside the housing and configured to project the image light reflected from the second mirror; and a coating part provided on one side of the glass panel and inside the housing and configured to prevent optical interference.

According to still another aspect of the disclosure, the first image obtained by the first camera and the second image obtained by the second camera are 3D images. According to still another aspect of the disclosure, each of the first monitor and the second monitor includes one of a light field display, a hologram display or a floating display.

According to still another aspect of the disclosure, each of the first monitor and the second monitor includes: an image source configured to output an image light of the first image obtained by the first camera, or the second image obtained by the second camera, an optical member configured to reflect the image light output from the image source inside, and then output to an outside, and a coating part provided on one side of the optical member and configured to prevent optical interference.

According to still another aspect of the disclosure, the first image obtained by the first camera and the second image obtained by the second camera are 3D images. According to still another aspect of the disclosure, each of the first monitor and the second monitor includes: an image source configured to output a left eye image light and a right eye image light of a first 3D image obtained by the first camera or a second 3D image obtained by the second camera, a waveguide plate including a first HoloLens configured to adjust a light path of the left eye image light, and a second HoloLens configured to adjust a light path of the right eye image light, and a coating part provided on one side of the waveguide plate and configured to prevent optical interference.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 3A, 3B, and 3C are diagrams illustrating examples of arrangement of first and second monitors of first and second side mirrors according to an embodiment;

FIGS. 5, 6A and 6B are diagrams illustrating a change in focal length of the first and second images of FIG. 4;

FIG. 16 is a flowchart illustrating vehicle control operations according to further embodiment.

DETAILED DESCRIPTION

Figure 1:
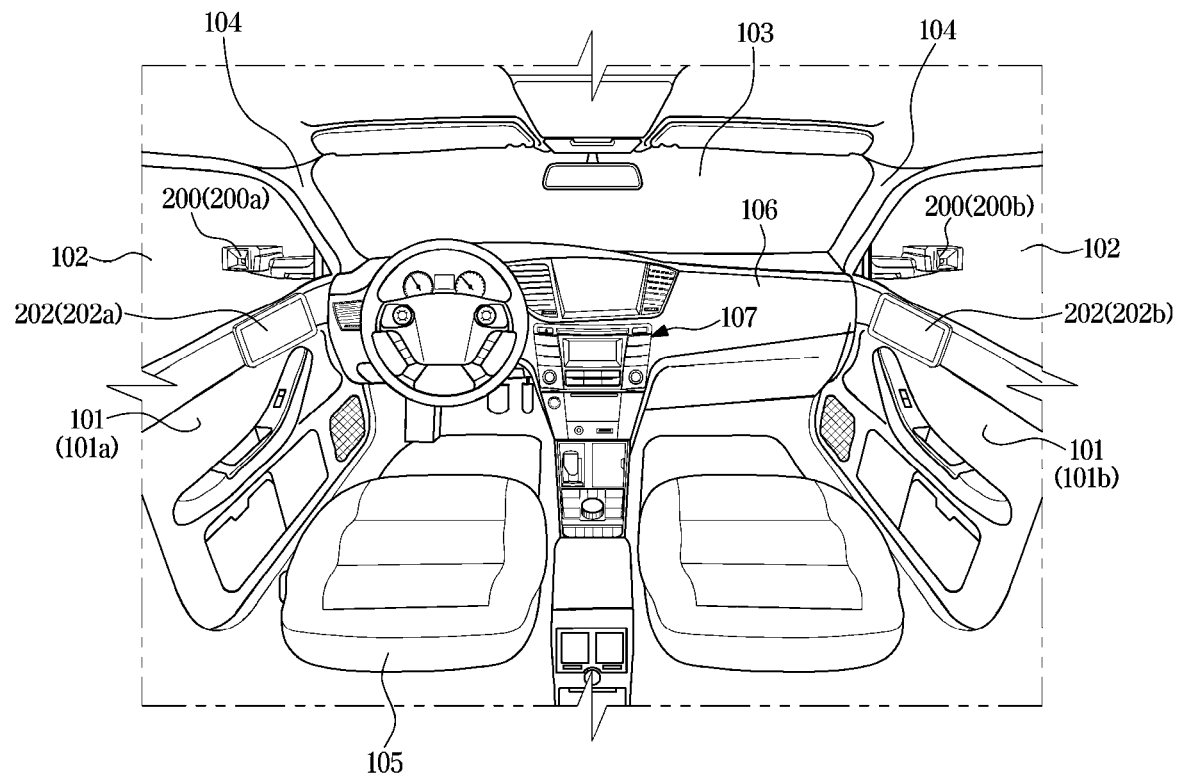
FIG. 1 is a diagram illustrating an example of an interior of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~device", and the like may refer to at least one process processed by at least one hardware or software. According to embodiments, a plurality of "~parts", "~members", "~modules", "~devices" may be embodied as a single element, or a single of a "~part", "~member", "~module", "~device" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of at least one other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

Figure 2:
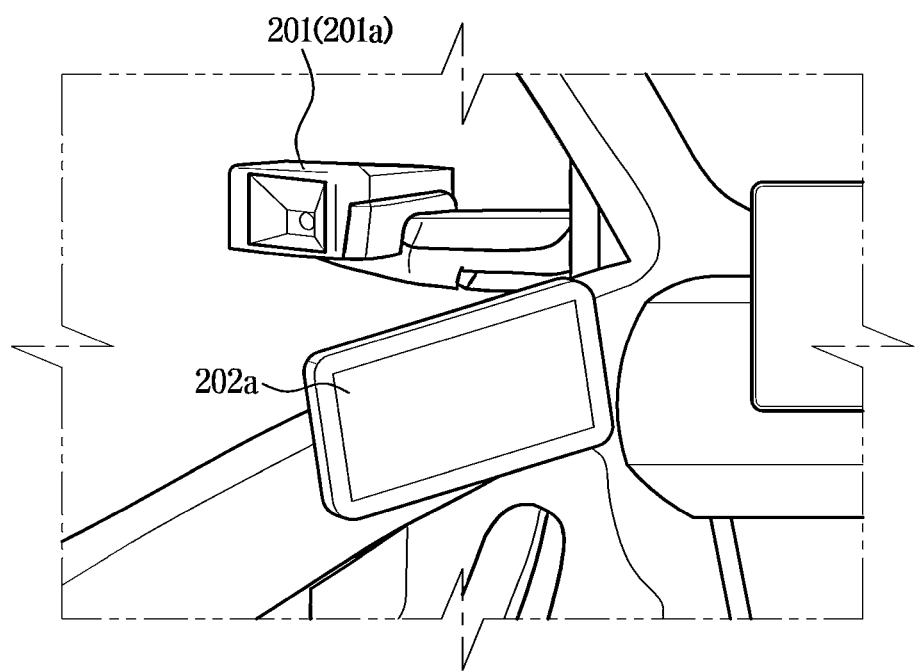
FIG. 2 is a diagram illustrating an example of an exterior of a side mirror according to an embodiment.
Figure 3B:
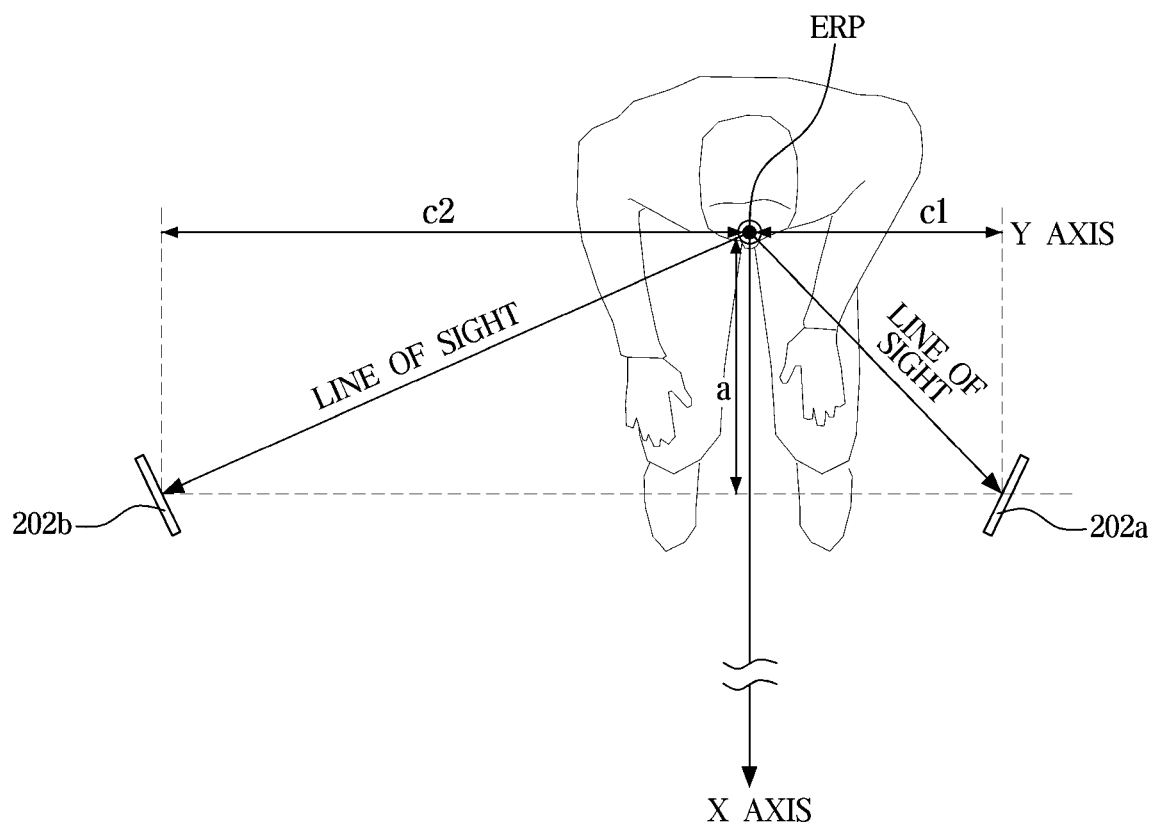
Figure 3C:
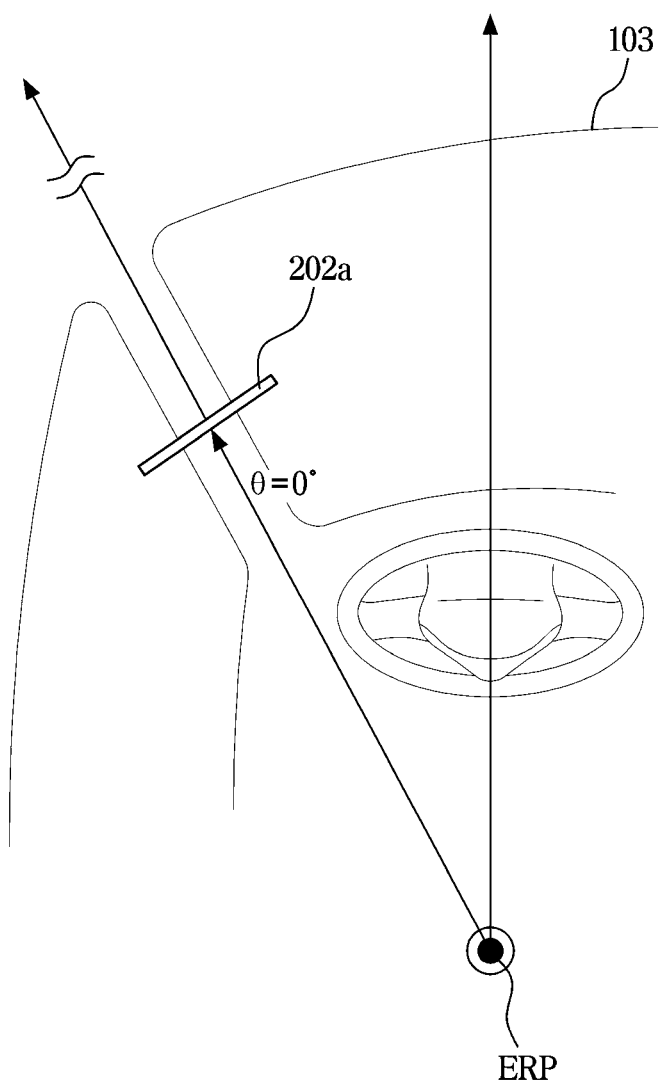

FIG. 1 is a diagram illustrating an example of an interior of a vehicle according to an embodiment. FIG. 2 is a diagram illustrating an example of an exterior of a side mirror according to an embodiment. FIGS. 3A, 3B, and 3C are diagrams illustrating examples of arrangement of first and second monitors of first and second side mirrors according to an embodiment.

A vehicle 1 includes a body having an exterior and an interior, and a chassis where mechanical devices for driving are mounted as a remaining portion except for the body.

The chassis of the vehicle 1 is a frame for supporting the body of the vehicle 1, and includes a power device, a steering device, and a brake device for applying a driving force, a steering force, and a braking force to the wheels of the vehicle 1, respectively, and further includes a suspension device and a gear box.

The body of the vehicle 1 includes a front panel, a bonnet, a roof panel, a rear panel, a plurality of doors 101 (101a and 101b), window glasses 102 provided to each of the doors 101 to be able to be open and closed, a front windshield glass 103 for securing a front view, and a rear windshield glass for securing a rear view.

The body of the vehicle 1 may further include pillars provided on left and right sides of the front windshield glass 103, on left and right sides of the rear windshield glass, and on edges of the window glasses.

For example, pillars may include A pillars 104 supporting the front windshield glass 103, provided on the left and right sides of the front windshield glass 103, and connected to the roof panel, B pillars provided between a front left door and a rear left door and provided between a front right door and a rear right door, and C pillars provided on the left and right sides of the rear windshield glass and at edges of the rear left and rear right doors.

The interior of the vehicle 1 includes seats 105, a dashboard 106, a cluster (i.e., an instrument panel), a head unit 107, a headliner, an overhead console, and a rear-view mirror. Here, the cluster provided on the dashboard 106 provides a user with information such as a driving speed, an engine speed, refueling amount, coolant, etc., and the head unit 107 is provided adjacent to the dashboard 106 to allow the user to control an audio device, an air conditioner, a Bluetooth device, a seat heater, etc. Also, the headliner is provided on upper side of the doors and forms a ceiling of the vehicle, the overhead console is provided on the headliner, and the rear-view mirror is provided on the headliner to secure a rear view.

The head unit 107 may be provided with an inputter 108 for receiving an operation command and operation information of at least one electronic device, and a display 109 for displaying operation information of various functions performable in the vehicle and information corresponding to a user input.

The inputter 108 receives a user input.

For example, the inputter 108 may receive a user command for an audio device or air conditioner, trunk opening/closing command, trunk lock command, trunk unlock command, window glass open command, window glass close command, opening/closing command of at least one door, lock command of at least one door, and unlock command of at least one door.

The inputter 108 may receive pan information and tilt information of a first monitor of a first side mirror and a second monitor of a second side mirror, and a folding command and an unfolding command for a first camera and a second camera.

The inputter 108 may receive a start command, an ignition off command, door lock command, and door unlock command.

The inputter 108 may be provided in at least one of a jog dial type, button type, or touchpad type.

The display 109 may display guide information about battery discharge and information about battery charging amount.

The vehicle 1 may further include a speaker 110. The speaker 110 may output sound information about battery discharge.

The vehicle 1 may further include side mirrors 200 providing a rear view of the vehicle 1, and folding members 203 (refer to FIG. 14) for folding and unfolding the side mirrors 200.

A plurality of side mirrors 200 may be provided.

A first side mirror 200a is provided on a driver seat door 101a to obtain a rear left view, and a second side mirror 200b is provided on a passenger seat door 101b to obtain a rear right view.

The first side mirror 200a and the second side mirror 200b may be implemented in a digital manner (referred to as a 'digital side mirror') to obtain a clear and wide-angle rear view and secure a decent rear view even in bad conditions such as at night or in rainy weather.

As shown in FIG. 2, the first side mirror 200a and the second side mirror 200b may include cameras 201a and 201b and monitors 202a and 202b, respectively.

The first side mirror 200a provided on the driver seat door 101a may include the first camera 201a provided outside of the driver seat door 101a and obtaining a rear left image, and the first monitor 202a provided in an interior side of the driver seat door 101a and displaying the image (i.e., a first image) obtained by the first camera 201a.

The second side mirror 200b provided on the passenger seat door 101b may include the second camera 201b provided outside of the passenger seat door 101b and obtaining a rear right image, and the second monitor 202b provided in an interior side of the passenger seat door 101b and displaying the image (i.e., a second image) obtained by the second camera 201b.

The first camera 201a and the second camera 201b may be a full high definition (FHD) camera for image processing.

The first camera 201a and the second camera 201b may include a charge-coupled device (CCD) or complimentary metal-oxide-semiconductor (CMOS) image sensor, and a three-dimensional (3D) space recognition sensor such as a KINECT (RGB-D sensor), Time of Flight (TOF), stereo camera, etc.

The first monitor 202a and the second monitor 202b may be an organic light-emitting diode (OLED) monitor, and may further include a system on chip (SOC) converting an analog signal into a digital signal and performing image processing.

The first monitor 202a may be provided in an interior side of the driver seat door 101a and closely to the window glass 102.

The first monitor 202a may be provided in an interior side of the A pillar 104 of the driver's seat side which is a left side of the interior of the vehicle, or on a left side of the dashboard 106, or on the cluster.

The second monitor 202b may be provided in an interior side of the passenger seat door 101b which is a right side of the interior of the vehicle, and closely to the window glass 102.

The second monitor 202b may be provided in an interior side of the A pillar 104 of the passenger seat side, or on a right side of the dashboard 106, or on the cluster.

An arrangement and a configuration of the first monitor 202a and the second monitor 202b are described with reference to FIGS. 3A, 3B and 3C.

As shown in FIGS. 3A and 3B, when a line in a forward direction from a user's eye position (also referred to as an eye reference point (ERP)) is an x-axis, a line in a ground direction from the user's eye position is a z-axis, and a line in left and right directions from the user's eye position is an y-axis, the first monitor 202a may be located at a value a on the x-axis, a value b on the z-axis, and a value $c_1$ on the y-axis, and the second monitor 202b may be located at the value a on the x-axis, the value b on the z-axis, and a value $c_2$ on the y-axis.

The value a on the x-axis of the first monitor 202a and the second monitor 202b may be selected as the largest value among values of the x-axis inside the vehicle to secure a longer focal length.

The value b on the z-axis of the first monitor 202a and the second monitor 202b may be selected as the smallest value among values of the z-axis inside the vehicle to reduce a change in height of sight (i.e., a change in head movement).

The value $c_1$ on the y-axis of the first monitor 202a may be selected as the smallest value among left values of the y-axis inside the vehicle to reduce an angular change between a left side and a center of a head.

The value $c_2$ on the y-axis of the first monitor 202a and the second monitor 202b may be selected as the smallest value among right values of the y-axis inside the vehicle to reduce an angular change between a right side and a center of a head.

The left values of the y-axis are y-axis values in a left direction based on the user's eye position, and the right values of the y-axis are y-axis values in a right direction based on the user's eye position.

As shown in FIG. 3C, the first monitor 202a and the second monitor 202b may be provided at an angle of approximately 0 degree to the front windshield glass 103. Accordingly, reflection on the front windshield glass 103 and the window glass provided on the door 101a, or direct light entry or glare on the first monitor 202a and the second monitor 202b may be prevented.

Through the above, design and layout of the first monitor and the second monitor may be made more freely and an image distortion may be improved.

Also, the first monitor and the second monitor may be provided so that images reflected from surfaces of the first monitor and the second monitor are perpendicular to the user's line of sight, and thus a space occupied by the first monitor and the second monitor may be minimized.

A display configuration of the first monitor 202a of the first side mirror 200a and the second monitor 202b of the second side mirror 200b is described with reference to FIGS. 4 to 7.

Figure 4:
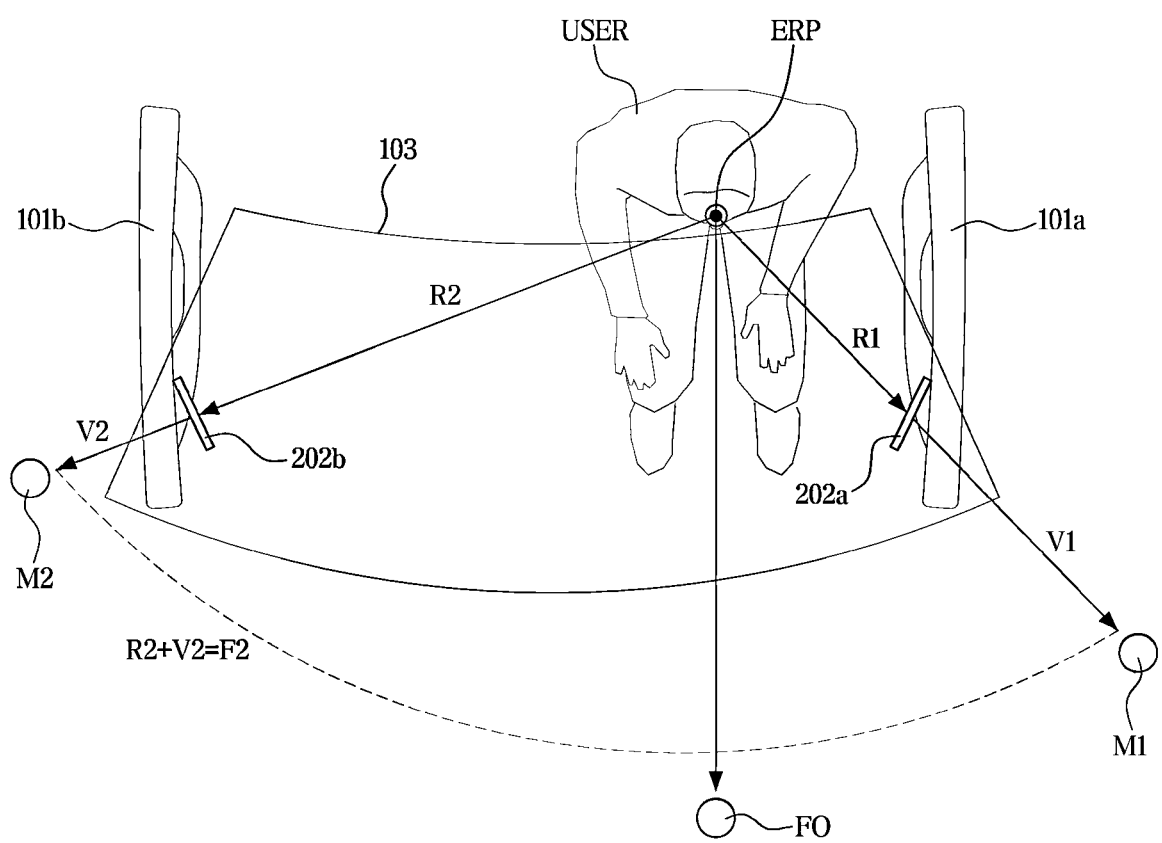
FIG. 4 is a diagram illustrating an example of a focal length of a first image displayed on a first monitor of a first side mirror and a focal length of a second image displayed on a second monitor of a second side mirror according to an embodiment.
Figure 5:
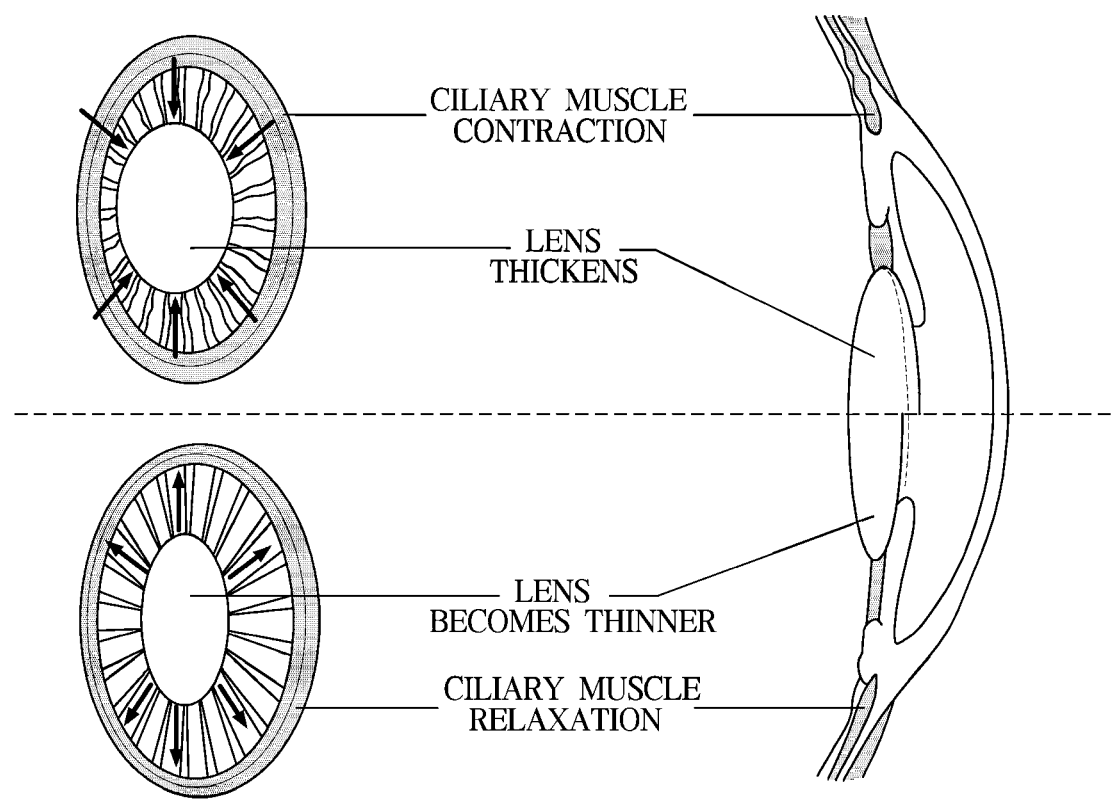
Figure 6A:
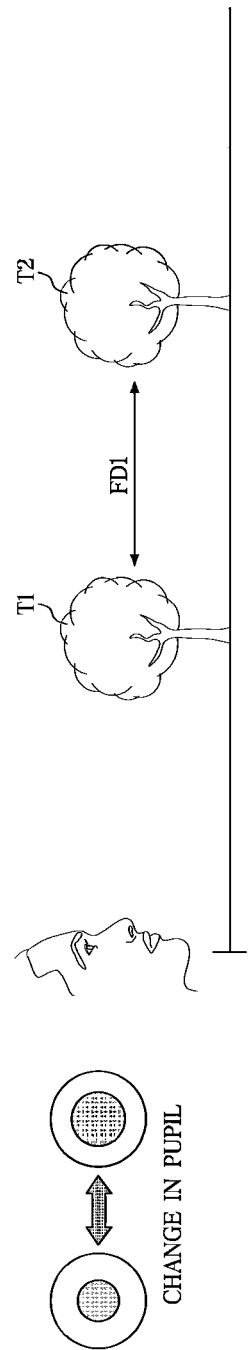
Figure 7:
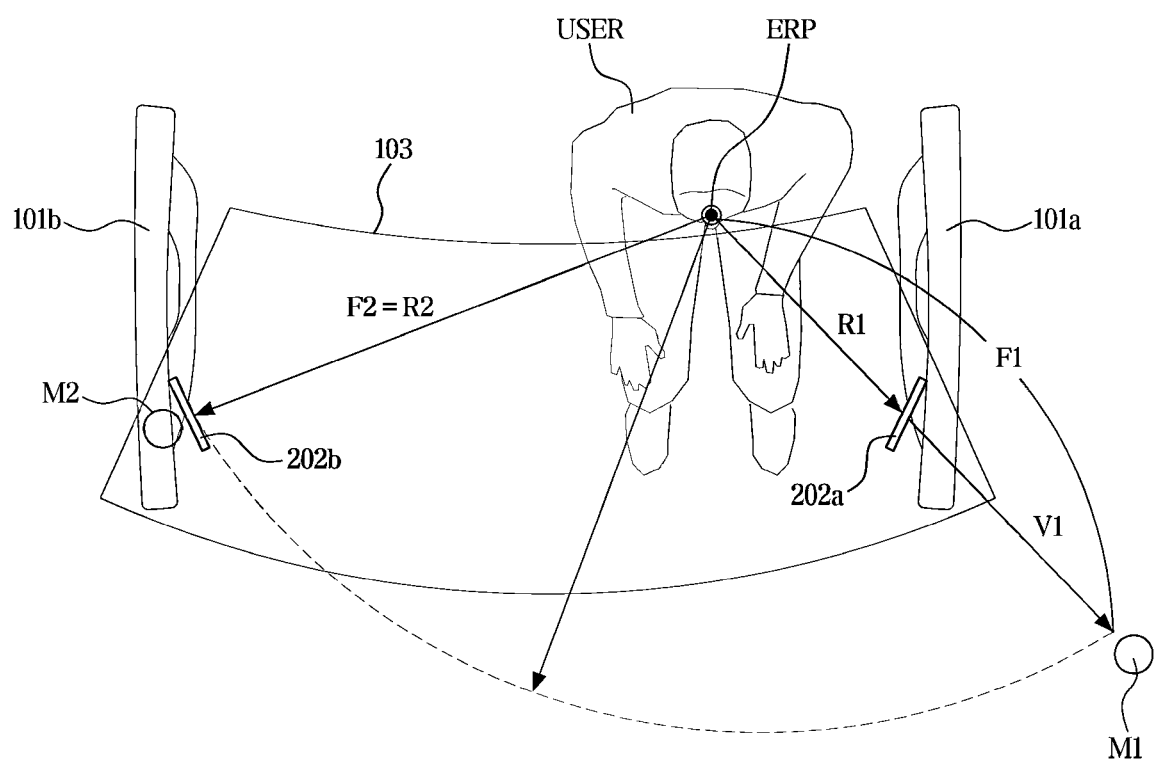
FIG. 7 is a diagram illustrating an example of a changed focal length of a first image displayed on a first monitor of a first side mirror and a changed focal length of a second image displayed on a second monitor of a second side mirror according to an embodiment.

FIG. 4 is a diagram illustrating an example of a focal length of a first image displayed on a first monitor of a first side mirror and a focal length of a second image displayed on a second monitor of a second side mirror according to an embodiment. FIGS. 5, 6A and 6B are diagrams illustrating a change in focal length of the first and second images of FIG. 4. FIG. 7 is a diagram illustrating an example of a changed focal length of a first image displayed on a first monitor of a first side mirror and a changed focal length of a second image displayed on a second monitor of a second side mirror according to an embodiment.

As shown in FIG. 4, the first side mirror 200a which is a digital side mirror may display a first image, obtained by the first camera 201a, on the first monitor 202a. In this instance, the first side mirror 200a may display the first image M1 with a first side focal length F1 which is longer than a first actual focal length R1 to a surface of the first monitor 202a from user's eyes.

The first side focal length F1 may be equal to a sum of the first actual focal length R1 and a first virtual focal length V1. The first virtual focal length V1 is a distance felt by the user through the first image M1 displayed on the first monitor 202a, and may be a virtual distance from the surface of the first monitor 202a to the first image M1.

The second side mirror 200b which is a digital side mirror may display an image, obtained by the second camera 201b, on the second monitor 202b. In this instance, the second side mirror 200b may display the second image M2 with a second side focal length F2 which is longer than a second actual focal length R2 to a surface of the second monitor 202b from the user's eyes ERR The second side focal length F2 may be equal to a sum of the second actual focal length R2 and a second virtual focal length V2. The second virtual focal length V2 is a distance felt by the user through the second image M2 displayed on the second monitor 202b, and may be a virtual distance from the surface of the second monitor 202b to the second image M2.

The first image M1 is obtained by the first camera 201a and displayed on the first monitor 202a, but may appear to the user's eyes as being displayed at the first side focal length F1.

The second image M2 is obtained by the second camera 201b and displayed on the second monitor 202b, but may appear to the user's eyes as being displayed at the second side focal length F2.

The first side focal length F1 and the second side focal length F2 refer to a distance at which the user's eyes are focused.

The first monitor 202a of the first side mirror and the second monitor 202b of the second side mirror may display the first image and the second image by extending focal lengths of the first image and the second image, respectively.

Through the above, when the user views a distant object FO in front through the front windshield glass 103, and then looks at the first image displayed on the first monitor 202a of the first side mirror or the second image displayed on the second monitor 202b of the second side mirror, the user may easily recognize left and right rear environments of the vehicle due to increase in focal length of the first image and the second image, respectively. Such principle is described with reference to FIGS. 5, 6A and 6B.

A person adjusts a thickness and curvature of a lens to focus on an object. In this instance, a ciliary muscle and frenulum connected to the lens move to adjust the thickness of the lens. A size of pupil changes in response to changes in the thickness and curvature of the lens.

As shown in FIG. 5, when the user looks at a nearby object, the ciliary muscle contracts, the frenulum stretches, the lens becomes convex, and thus a focal length is shortened. Also, when the user looks at a distant object, the ciliary muscle relaxes, the frenulum is pulled, the lens becomes flattened, and thus a focal length is increased.

As shown in FIG. 6A, when a difference TD1 between a focal length of a first object T1 and a focal length of a second object T2 is less than or equal to a reference distance, a change rate of a pupil changing for a predetermined period of time becomes smaller than a reference change rate, and thus a speed of recognizing the second object T2 may be increased.

As shown in FIG. 6B, when a difference TD2 between a focal length of the first object T1 and a focal length of a third object T3 is greater than the reference distance, a change rate of a pupil changing for a predetermined period of time becomes greater than a reference change rate, and thus a speed of recognizing the third object T3 may be decreased.

As described above, when the user changes the user's line of sight, a focal length for viewing an object changes, and in this instance, as the change in focal length increases, a speed of recognizing an object may be delayed.

A distance from a user's location in a driver's seat to a distant object in front is greater than a distance from the user's location in the driver's seat to the first monitor 202a of the first side mirror or the second monitor 202b of the second side mirror. Accordingly, when the user changes the user's line of sight from a front to the first monitor or the second monitor, a speed of recognizing the first image displayed on the first monitor 202a or the second image displayed on the second monitor 202b may slow down due to a change in focal length.

In order to prevent the above, the first monitor 202a according to an embodiment displays the first image M1 whose focal length is increased according to a focal length when a user in a driver's seat views a distant object in front. Also, the second monitor 202b displays the second image M2 whose focal length is increased according to a focal length when the user in the driver's seat views a distant object in front.

That is, the first image and the second image displayed on the first monitor 202a and the second monitor 202b, respectively, may have a focal length corresponding to a focal length when viewing a distant object in front.

For example, in displaying the first image whose focal length is increased through the first monitor 202a, when the user views the distant object FO in front through the front windshield glass 103, and then looks at the first monitor 202a, a difference in focal length between a focal length for the distant object FO in front and a focal length for the first image displayed on the first monitor 202a is less than or equal to a reference distance. That is, the first monitor 202a or the second monitor 202b may minimize the change in focal length due to the change in user's line of sight, allowing the user to easily recognize left and right rear environment of the vehicle.

In general, the second monitor 202b is provided at a greater distance than the first monitor 202a based on the driver's seat position.

As shown in FIG. 7, a focal length of the first image M1 displayed on the first monitor 202a may be set based on a distance between the driver's seat and the second monitor 202b.

The distance between the driver's seat and the second monitor 202b may correspond to the second actual focal length R2 of the second image M2 displayed on the second monitor 202b.

The first monitor 202a may display the first image with the first side focal length F1 and the second monitor 202b may display the second image with the second actual focal length R2.

The first side focal length F1 may be a sum of the first actual focal length R1 and the first virtual focal length V1.

The second actual focal length R2 may be equal to the second side focal length F2.

Hereinafter, configurations of the first monitor and the second monitor displaying images with focal lengths greater than a distance to each of the surfaces of the first monitor and the second monitor are described.

The configurations of the first monitor and the second monitor may be the same, and the first monitor is described as an example.

Figure 8:
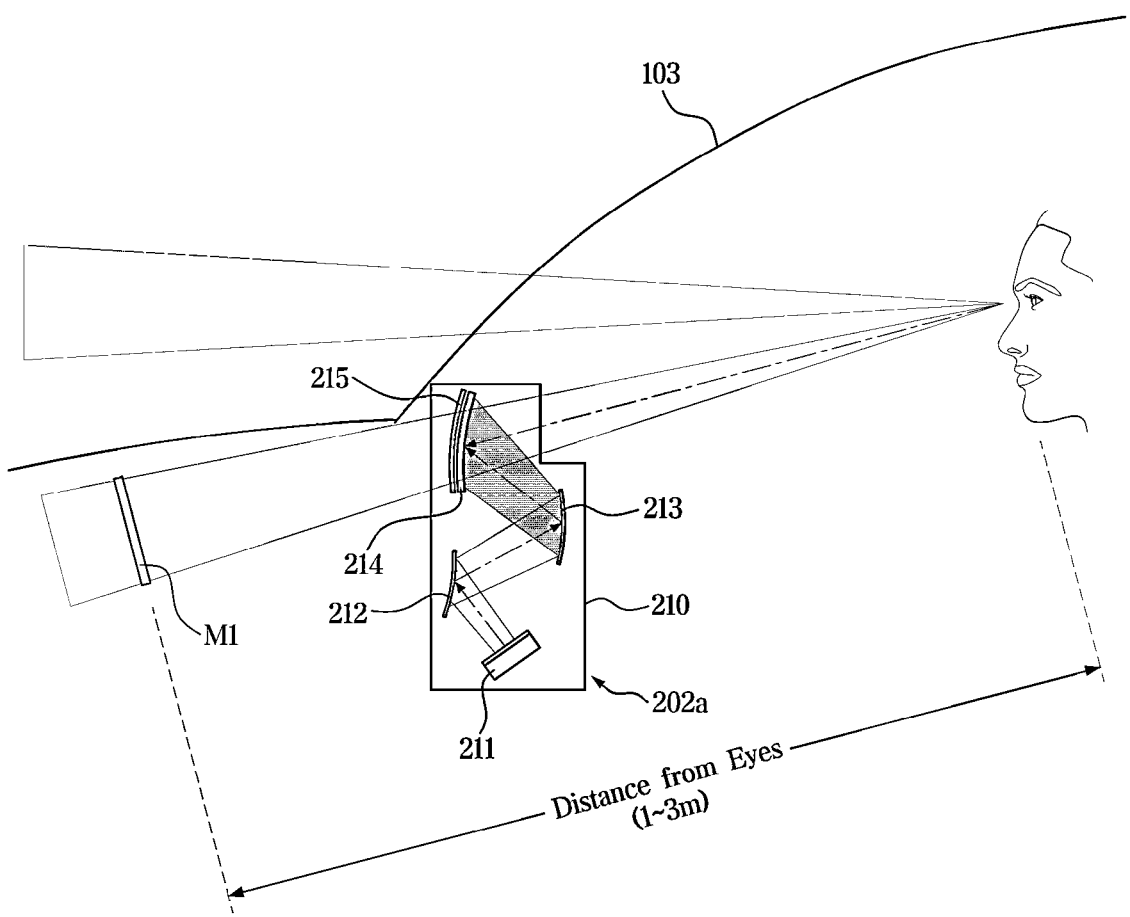
FIG. 8 is a diagram illustrating a configuration of a first monitor of a first side mirror according to an embodiment.

FIG. 8 is a diagram illustrating a configuration of a first monitor of a first side mirror according to an embodiment.

The first monitor 202a includes a housing 210 forming an exterior of the first monitor.

The housing 210 has a first area provided inside of the door 101a and a second area provided outside the door 101a.

The housing 210 may be provided inside the dashboard 106 or the A pillar 104.

The first monitor 202a may further include an image source 211 provided in the first area of the housing 210, a first mirror 212, a second mirror 213, a glass panel 214 and a coating part 215 provided in the first area of the housing 210.

The image source 211 may be fixed in the first area of the housing 210, and be connected to the first camera 201a.

The image source 211 receives a first image obtained from the first camera 201a, performs image processing on the received first image, and then outputs the processed first image toward the first mirror 212.

The image source 211 may output an image light of the first image obtained from the first camera 201a. The image source 211 may output an image light of the two-dimensional (2D) first image.

The image source 211 may be a projector or an image display device.

The first mirror 212 may be a plane mirror.

The first mirror 212 may be a spherical mirror. The first mirror 212 may be a concave mirror.

The first mirror 212 receives the image light, output from the image source 211, and refracts and reflects the received image light.

The first mirror 212 may allow a distance of the displayed first image to be easily adjusted.

The image light refracted and reflected by the first mirror 212 is transmitted to the second mirror 213.

The image source 211 and the first mirror 212 may form a first angle. Here, the first angle may be an angle at which the image light, output from the image source 211, is incident.

The second mirror 213 may be spaced apart from the first mirror 212 by a first distance. The first distance may be a distance at which the image light, refracted and reflected by the first mirror 212, may be incident.

The second mirror 213 may be a spherical mirror having a preset curvature. The second mirror 213 may be a convex mirror.

The second mirror 213 may enlarge a size of the incident image light.

The second mirror 213 may refract and reflect the incident image light.

The image light reflected from the second mirror 213 is incident on the glass panel 214, and the glass panel 214 projects the incident image light. The image light projected from the glass panel 214 may be displayed as the image obtained by the first camera 201a.

The image light projected from the glass panel 214 appears to be focused at a distance farther than a distance to a surface of the glass panel 214 to the user.

The coating part 215 may be provided on one side of the glass panel 214. Here, the one side of the glass panel 214 may be a rear surface of a surface on which the image light reflected from the second mirror 213 is incident.

The coating part 215 prevents optical interference such as diffuse reflection of the light incident into the housing 210 or diffuse reflection of the light incident by the second mirror 213.

The coating part 215 may be a matt film.

The coating part 215 may be paint or varnish.

The coating part 215 may be black.

The coating part 215 may be coated on the glass panel 214 by a coating method.

With respect to a light path of the image light of the first monitor, the image light output from the image source 211 is refracted and reflected by the first mirror 212. Also, when the image light refracted and reflected by the first mirror 212 is incident on the second mirror 213, the incident image light is enlarged and reflected by the second mirror 213. The image light enlarged and reflected by the second mirror 213 is projected onto the glass panel 214.

In this case, an actual first image corresponding to the image light is formed on the glass panel 214, but the user does not recognize the actual first image. In this instance, the first image recognized by the user is a virtual first image (or, referred to as 'imaginary first image') and is located on the rear surface of the glass panel 214.

The first image recognized by the user may be a 2D image.

The first monitor 202a may further include a lens 216 for adjusting a size of the first image. The lens 216 may enlarge the first image.

The lens 216 may be provided on the glass panel 214.

A surface on which the lens 216 is provided may be a front surface of the glass panel 214, and be opposite to the surface on which the coating part 215 is provided.

Figure 9:
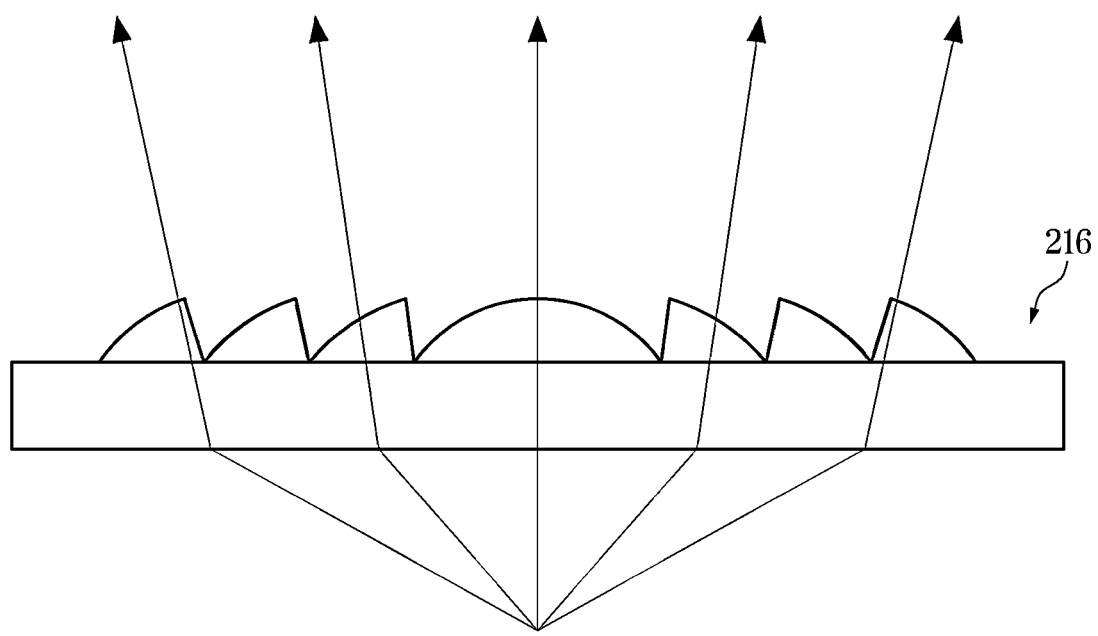
FIG. 9 is a diagram illustrating an example of a lens provided in a first monitor of a first side mirror according to an embodiment.

As shown in FIG. 9, the lens 216 may be a Fresnel lens.

Figure 10:
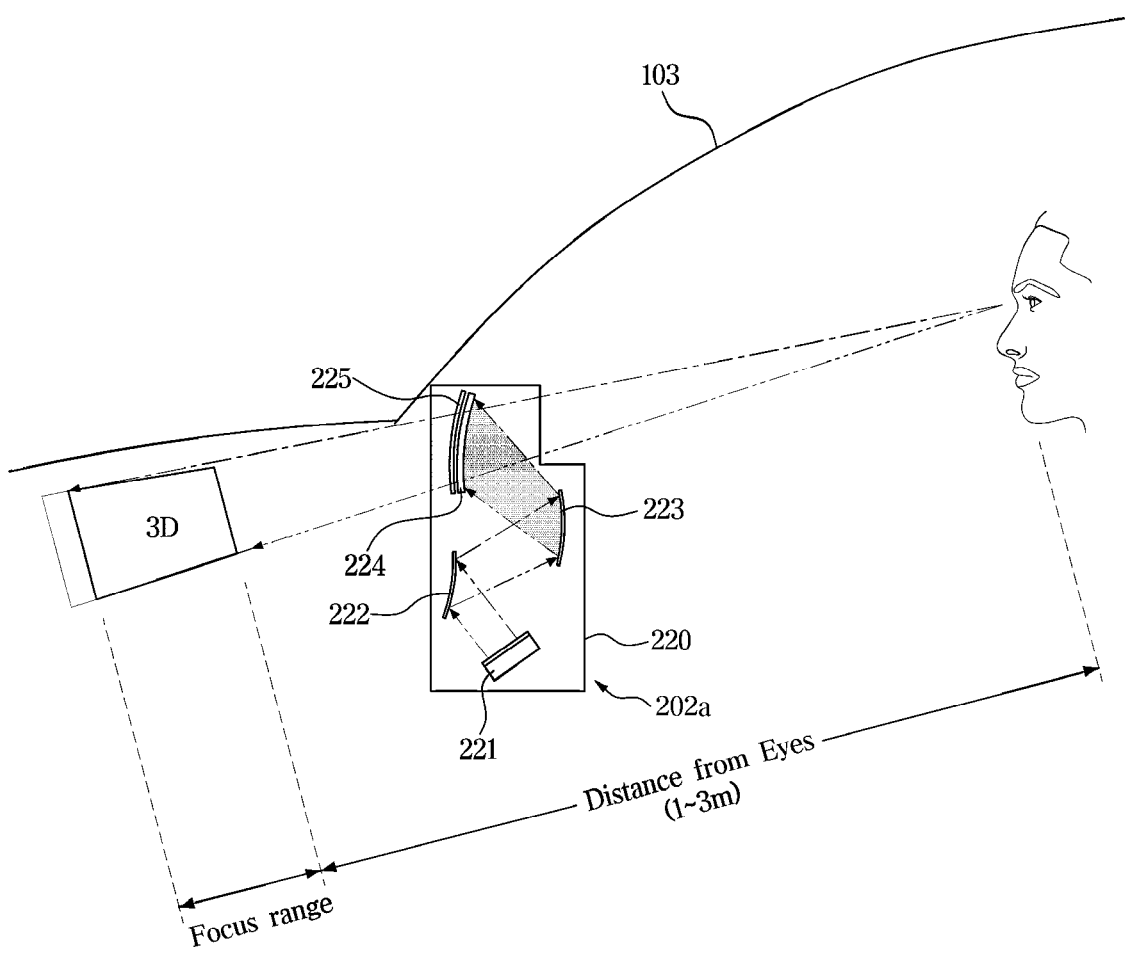
FIG. 10 is a diagram illustrating a configuration of a first monitor of a first side mirror according to another embodiment.

FIG. 10 is a diagram illustrating a configuration of a first monitor of a first side mirror according to another embodiment. Although a first monitor according to an embodiment and a first monitor according to another embodiment have different configurations, both first monitors are referred to as the first monitor 202a.

The first monitor 202a includes a housing 220 forming an exterior of the first monitor.

The housing 220 has a first area provided inside of the door 101a and a second area provided outside the door 101a.

The housing 220 may be provided inside the dashboard 106 or the A pillar 104.

The first monitor 202a may further include an image source 221 provided in the first area of the housing 220, a first mirror 222, a second mirror 223, a glass panel 224 and a coating part 225 provided in the first area of the housing 220.

The image source 221 may be fixed in the first area of the housing 220, and be connected to the first camera 201a.

The image source 221 receives a first image obtained from the first camera 201a, performs image processing on the received first image, and then generates a 3D image using the processed first image and outputs the generated 3D image toward the first mirror 222.

Here, the 3D image may include a left eye image and a right eye image to which binocular disparity is applied.

The 3D image may be a holographic image.

The 3D image may be a floating image.

A configuration of the image source 221 may vary depending on a type of the 3D image, which is described later.

The first mirror 222 may be a plane mirror.

The first mirror 222 may be a spherical mirror. The first mirror 222 may be a concave mirror.

The first mirror 222 receives the image light, output from the image source 221, and refracts and reflects the received image light.

The first mirror 222 may allow a distance of the displayed image to be easily adjusted.

The image light refracted and reflected by the first mirror 222 is transmitted to the second mirror 223.

The image source 221 and the first mirror 222 may form a first angle. Here, the first angle may be an angle at which the image light, output from the image source 221, is incident.

The second mirror 223 may be spaced apart from the first mirror 222 by a first distance. The first distance may be a distance at which the image light, refracted and reflected by the first mirror 222, may be incident.

The second mirror 223 may be a spherical mirror having a preset curvature. The second mirror 223 may be a convex mirror.

The second mirror 223 may enlarge a size of the incident image light.

The second mirror 223 may refract and reflect the incident image light.

The image light reflected from the second mirror 223 is incident on the glass panel 224, and the glass panel 224 reflects the incident image light. The image light reflected from the glass panel 224 may be displayed as the first image obtained by the first camera 201a.

The image light reflected from the glass panel 224 appears to be focused at a distance farther than a distance to a surface of the glass panel 224 to the user.

The coating part 225 may be provided on one side of the glass panel 224.

The one side of the glass panel 224 may be a rear surface of a surface on which the image light reflected from the second mirror 223 is incident.

The coating part 225 prevents optical interference such as diffuse reflection of the light incident into the housing 220 or diffuse reflection of the light incident by the second mirror 223.

The coating part 225 may be a matt film. The coating part 225 may be paint or varnish.

The coating part 225 may be black.

The coating part 225 may be coated on the glass panel 224 by a coating method.

The first monitor of the first side mirror according to another embodiment may also further include the lens shown in FIG. 9.

With respect to a light path of the image light of the first monitor, the image light output from the image source 221 is refracted and reflected by the first mirror 222. Also, when the image light refracted and reflected by the first mirror 222 is incident on the second mirror 223, the incident image light is enlarged and reflected by the second mirror 223. The image light enlarged and reflected by the second mirror 223 is focused on the glass panel 224.

In this case, an actual image corresponding to the image light is formed on the glass panel 224, but the user does not recognize the actual image. In this instance, the image recognized by the user is a virtual image (or, referred to as 'imaginary image') and is located on the rear surface of the glass panel 224.

The image recognized by the user may be a 3D image.

Examples of a configuration of the image source 221 of the first monitor shown in FIG. 10 are described with reference to FIGS. 11A, 11B and 11C.

As a first example, the image source 221 may include a plurality of projectors outputting an image in different directions.

As a second example, the image source 221 may include a light field display.

The light field display may output a left eye image light and a right eye image light so that different image information is input to user's two eyes.

Figure 11A:
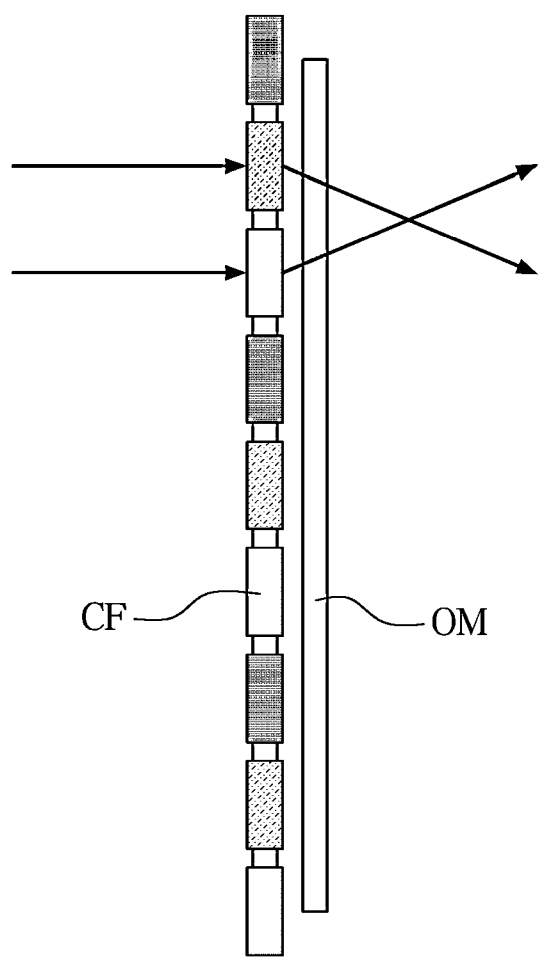
FIGS. 11A, 11B, and 11C are diagrams illustrating examples of the image source shown in FIG. 10.

As shown in FIG. 11A, the light field display may include a color film (CF), and an optical member (OM) adjusting directions of the light so that the left eye image light and the right eye image light are output in different directions.

The optical member may include a barrier, a lenticular lens, or a microlens array.

The optical member may include a grating or a pinhole.

However, types of the optical member are not limited thereto, and an optical member may be of any types, as long as it may adjust a light path to generate a 3D image.

When the image source 221 is the light field display, the first camera 201a of the first side mirror may be a 3D camera obtaining a left eye image and a right eye image. The first camera 201a may include a 2D left eye camera for obtaining the left eye image and a 2D right eye camera for obtaining the right eye image.

When the first camera 201a is provided with the left eye camera and the right eye camera, the image source 221 may output the left eye image and the right eye image. Here, outputting the left eye image and the right eye image may include outputting a left eye image light for the left eye image and a right eye image light for the right eye image.

When the first camera 201a is a 3D camera, the image source 221 may separate a 3D image into a left eye image and a right eye image, and output a left eye image light for the left eye image and a right eye image light for the right eye image.

As a third example, the image source 221 may include a hologram display outputting a holographic image.

Figure 11B:
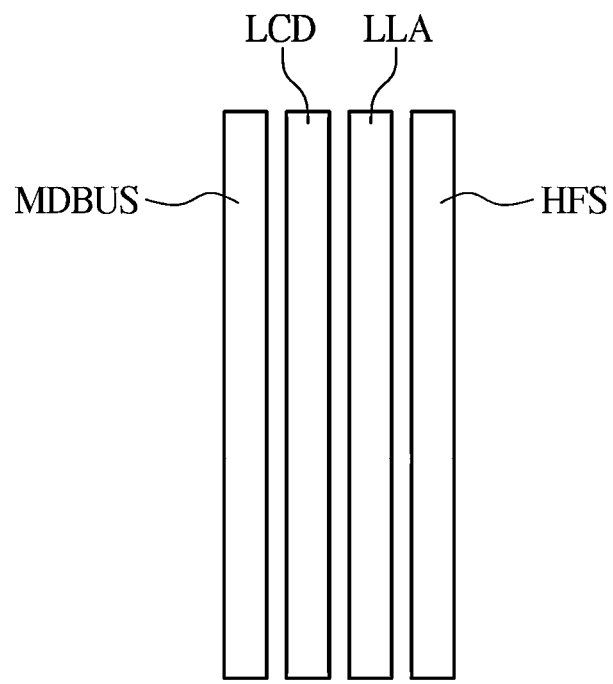

As shown in FIG. 11B, the hologram display may include a multi-directional backlight units (MDBUs), a liquid display panel (LCD), a holographic functional screen (HFS), and may further include a lenticular lens array (LLA).

The image source 221 may output a holographic image by outputting the first image at multiple angles.

As a fourth example, the image source 221 may include a display panel, a mirror, a holographic film, and generate an interference pattern for the image obtained by the first camera 201a using a coherent light source, thereby outputting a holographic image which is a 3D stereoscopic image.

As a fifth example, the image source 221 may include a floating display displaying a floating image.

The floating display may include a display and a waveguide plate (or an optical guide plate). The display may be a micro display, a color filter, or a red, green and blue (RGB) source. The waveguide plate guides a left eye image light and a right eye image light to different light paths.

Figure 11C:
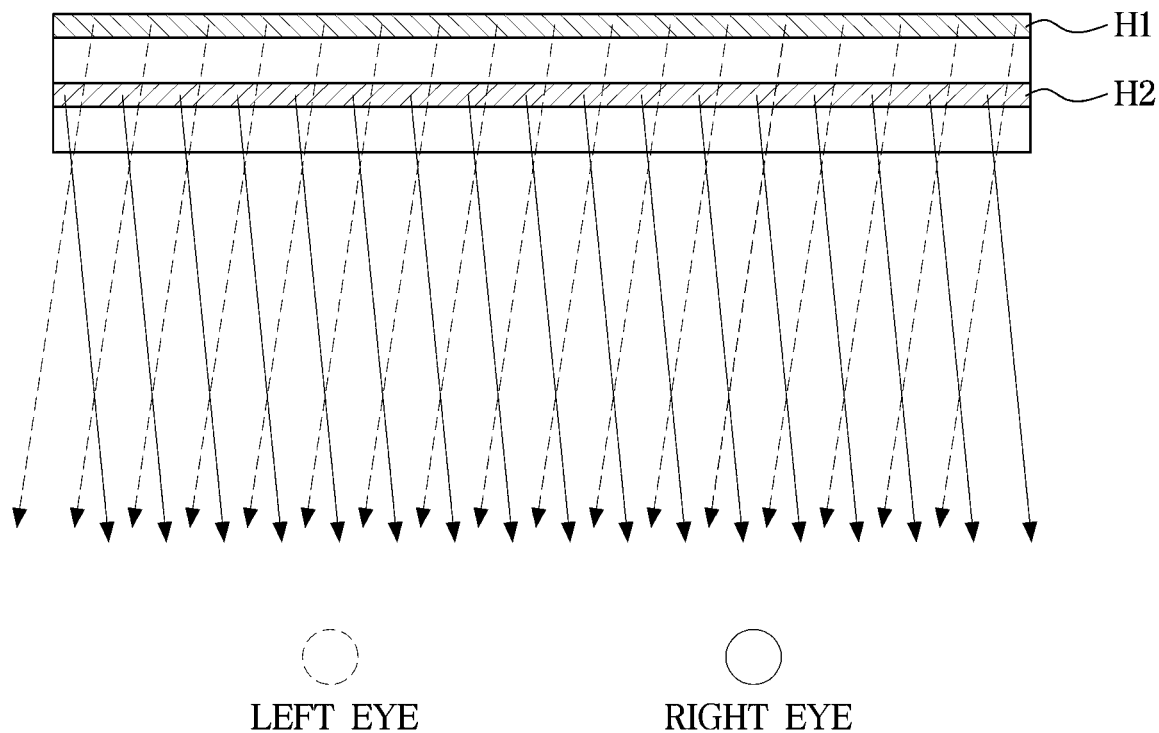

As shown in FIG. 11C, the floating display may include a display displaying the first image obtained by the first camera, a first HoloLens H1 adjusting a light path of a left eye image of the first image, and a second HoloLens H2 adjusting a light path of a right eye image of the first image.

Figure 12:
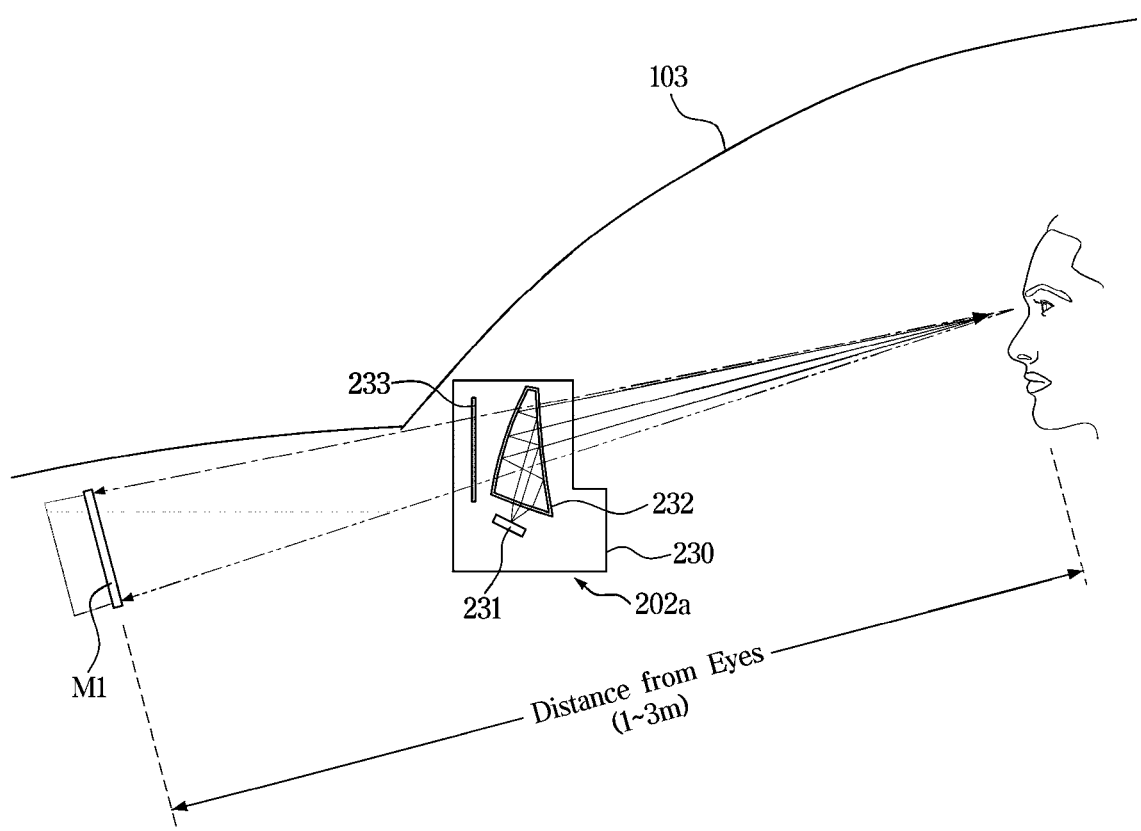
FIG. 12 is a diagram illustrating a configuration of a first monitor of a first side mirror according to still another embodiment.

FIG. 12 is a diagram illustrating a configuration of a first monitor of a first side mirror according to still another embodiment.

The first monitor 202a includes a housing 230 forming an exterior of the first monitor.

The housing 230 has a first area provided inside of the door 101a and a second area provided outside the door 101a.

The housing 230 may be provided inside the dashboard 106 or the A pillar 104.

The first monitor 202a may include an image source 231 an optical member 232, and a coating part 233 provided in the first area of the housing 230.

The image source 231 may be fixed in the first area of the housing 230, and be connected to the first camera 201a.

The image source 231 receives a first image obtained from the first camera 201a, performs image processing on the received first image, and then outputs the processed first image toward the optical member 232.

The image source 231 may output an image light of the first image obtained from the first camera 201a. The image source 231 may output an image light of the 2D first image.

The image source 231 may be a projector or an image display device.

The optical member 232 receives the image light output from the image source 231. In this instance, the received image light may be reflected inside the optical member 232, and then be output to the outside. The image light output through the optical member 232 may be recognized by user's eyes as the first image.

The optical member 232 may be a 'freeform partially reflective lens'.

The optical member 232 may be a total internal reflection (TIR) freeform prism.

The coating part 233 may be provided on one side of the optical member 232. Here, the one side of the optical member 232 may be a rear surface of a surface on which light is output.

The coating part 233 prevents optical interference such as diffuse reflection of the light incident into the housing 230 or diffuse reflection of the light incident by the optical member 232.

The coating part 233 may be a matt film.
The coating part 233 may be paint or varnish.
The coating part 233 may be black.
The coating part 233 may be formed by a coating method.
The first image recognized by the user may be a 2D image.

The first monitor 202a may further include a lens for adjusting a size of the first image. The lens 216 may enlarge the first image.

A surface on which the lens is provided may be a front surface of the optical member 232, and be opposite to the surface on which the coating part 233 is provided.

As shown in FIG. 9, the lens 216 may be a Fresnel lens.

In this case, the first monitor may display the 2D first image at a distance farther than a distance to a surface of the optical member 232.

The image source 231 shown in FIG. 12 may output a 3D image. Here, the 3D image may be a left eye image and a right eye image to which binocular disparity is applied, a holographic image, or a floating image. In this case, the first monitor may display the 3D first image at a distance farther than a distance to a surface of the optical member 232.

The image source 231 for outputting a 3D image may include a plurality of projectors.

The image source 231 for outputting a 3D image may be a light field display, a hologram display, or a floating display.

Configurations of the light field display, the hologram display, or the floating display have been described above, and thus a description thereof is omitted herein.

Figure 13:
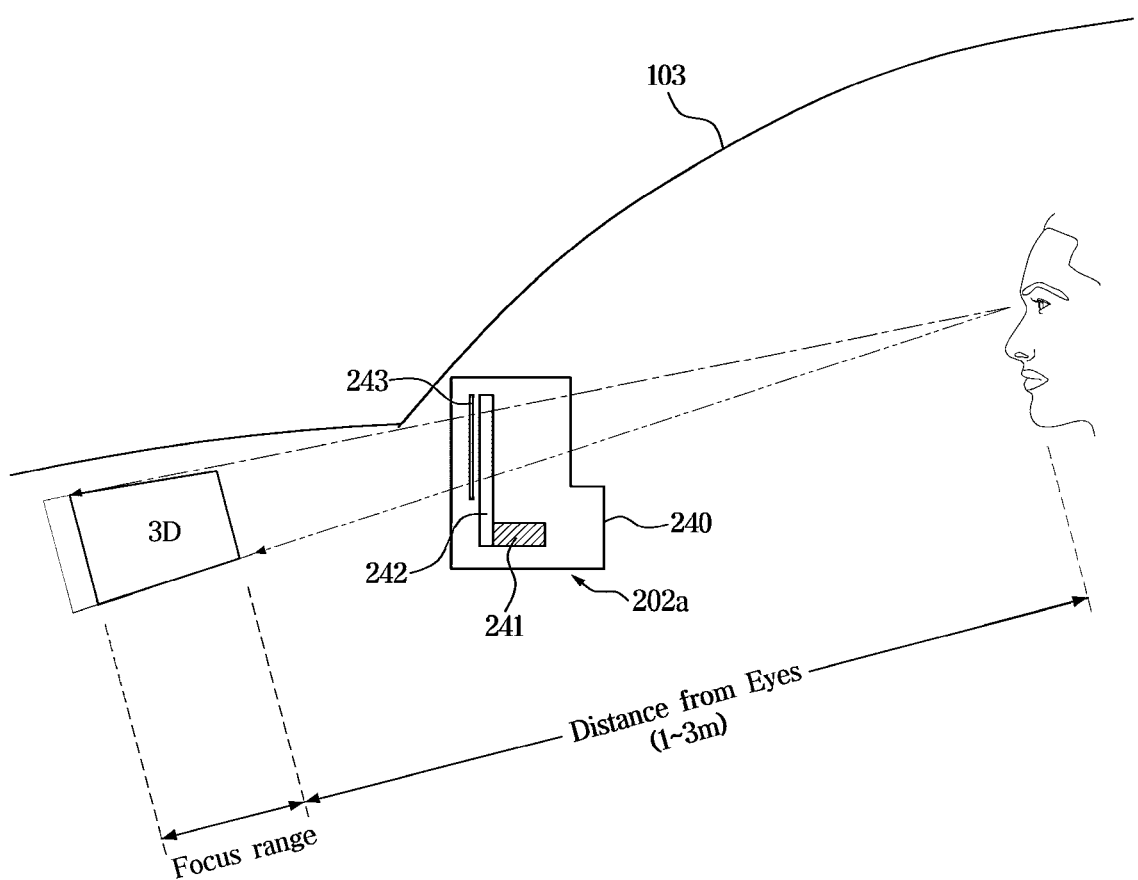
FIG. 13 is a diagram illustrating a configuration of a first monitor of a first side mirror according to yet another embodiment.

FIG. 13 is a diagram illustrating a configuration of a first monitor of a first side mirror according to yet another embodiment.

The first monitor 202a includes a housing 240 forming an exterior of the first monitor.

The housing 240 has a first area provided inside of the door 101a and a second area provided outside the door 101a.

The housing 240 may be provided inside the dashboard 106 or the A pillar 104.

The first monitor 202a may further include an image source 241, a waveguide plate 242, and a coating part 243 provided in the first area of the housing 240.

The image source 241 may be fixed in the first area of the housing 240, and be connected to the first camera 201a.

The image source 241 receives a first image obtained from the first camera 201a, performs image processing on the received first image, and then outputs the processed first image toward the waveguide plate 242.

The image source 241 may output an image light of the first image obtained from the first camera 201a. The image source 241 may output an image light of the 3D first image. The image light of the 3D first image may include a left eye image light and a right eye image light.

The image source 241 may be a micro display or an RGB source.

The waveguide plate 242 receives the image light output from the image source 241. In this instance, the received image light may be output to the outside through the waveguide plate 242. The image light output through the waveguide plate 242 may be recognized by user's eyes as the first image.

The waveguide plate 242 may output the left eye image light and the right eye image light output from the image source 241 in different directions, thereby providing a disparity to the image light output from the image source 241.

The waveguide plate 242 may include a HoloLens assembly. The waveguide plate 242 may be the same as that shown in FIG. 11C.

The coating part 243 may be provided on one side of the waveguide plate 242. Here, the one side of the waveguide plate 242 may be a rear surface of a surface on which the image light is output among surfaces of the waveguide plate 242.

The coating part 243 may be a matt film.
The coating part 243 may be paint or varnish.
The coating part 243 may be black.
The coating part 243 may be formed by a coating method.
A clarity of the 3D image output through the waveguide plate 242 may be increased by the coating part 243.

The first image recognized by the user may be a 3D image.

The first monitor 202a may further include a lens for adjusting a size of the first image. The lens may enlarge the first image.

A surface on which the lens is provided may be a front surface of the waveguide plate 242, and be opposite to the surface on which the coating part 243 is provided. As shown in FIG. 9, the lens may be a Fresnel lens.

Figure 14:
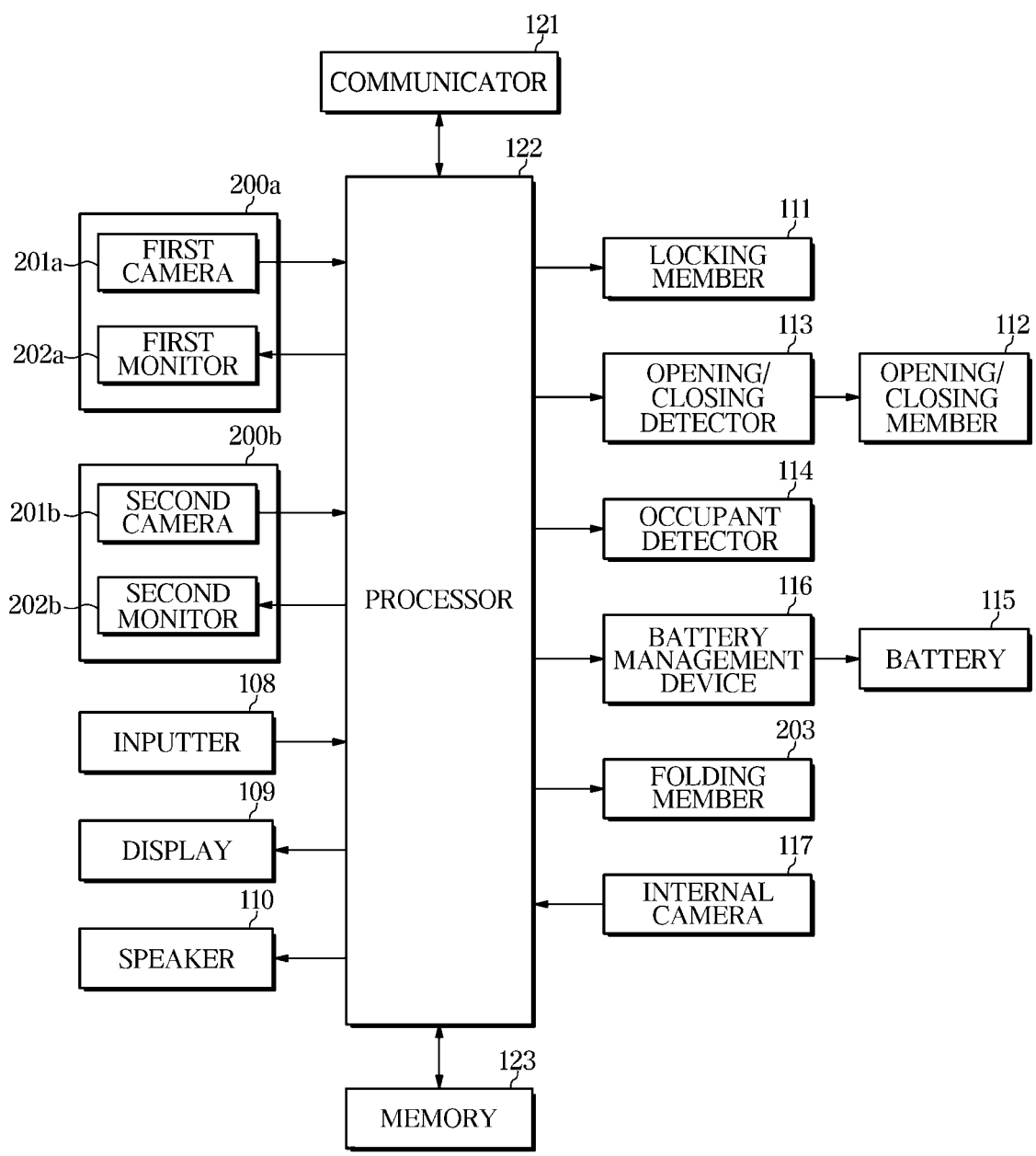
FIG. 14 is a diagram illustrating a configuration of a vehicle according to further embodiment.

FIG. 14 is a diagram illustrating a configuration of a vehicle according to further embodiment, which is described with reference to FIG. 15.

Figure 15:
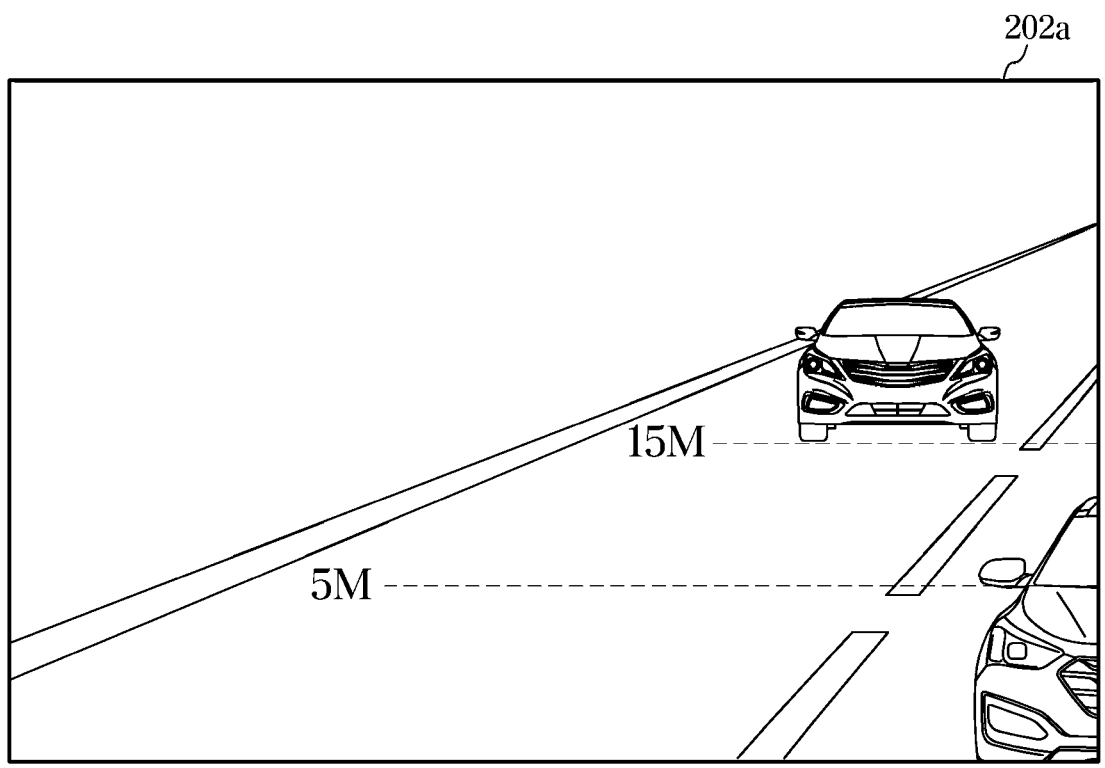
FIG. 15 is a diagram illustrating an example of an image displayed on a first monitor of a first side mirror provided in a vehicle according to further embodiment.

FIG. 15 is a diagram illustrating an example of an image displayed on a first monitor of a first side mirror provided in a vehicle according to further embodiment.

The vehicle 1 includes an inputter 108, a display 109, a speaker 110, a locking member 111, an opening/closing member 112, an opening/closing detector 113, an occupant detector 114, a battery 115, a battery management device 116, an internal camera 117, a communicator 121, a processor 122, and a memory 123, and may further include a first side mirror, a second side mirror, and a folding member 203.

The inputter 108 may receive pan information and tilt information of a first monitor of the first side mirror and a second monitor of the second side mirror, and a folding command and an unfolding command of a first camera and a second camera.

The inputter 108 may receive a start command and an ignition off command, and a door lock command and a door unlock command.

The display 109 may display guide information about battery discharge and information about battery charging amount.

The speaker 110 may output sound information about battery discharge.

The locking member 111 may be provided on each of a plurality of doors of the vehicle, and lock or unlock each door in response to a control command of the processor.

The opening/closing member 112 may be provided on each of the plurality of doors of the vehicle, and allow each door to be separated from the vehicle body or coupled to the vehicle body by user's force. That is, the door may be opened by being separated from the vehicle body, and be closed by being coupled to the vehicle body.

The opening/closing detector 113 may detect whether each door is opened, and output an opening signal in response to the opening of door, and a close signal in response to the closing of the door.

The occupant detector 114 detects an occupant of each seat to recognize the number of occupants and presence or absence of occupants, and outputs information about the detected occupant.

The occupant detector 114 may be provided on at least one of the seats or seatbelts of the vehicle.

For example, the occupant detector 114 may include at least one of a weight sensor, a pressure sensor, a capacitive sensor, or a seatbelt fastening sensor.

The occupant detector 114 may include a camera provided inside the vehicle.

The battery 115 may be a battery capable of being charged or discharged.

The battery 115 supplies power to various electronic devices provided in the vehicle.

For example, the battery 115 may supply power to the inputter 108, the display 109, the speaker 110, the locking member 111, the opening/closing member 112, the opening/closing detector 113, the occupant detector 114, the battery management device 116, the internal camera 117, the communicator 121, the processor 122, the memory 123, the first side mirror, the second side mirror, and the folding member 203.

The battery management device 116 may monitor a state of charge (SoC) of the battery 115, and transmit information about the monitored SoC of the battery 115 to the processor 122.

The internal camera 117 may be provided inside the vehicle, and obtain a user image.

The internal camera 117 may be a camera for detecting drowsiness of user or monitoring a state inside the vehicle.

The communicator 121 may include at least one constituent component enabling communication between an external device and the constituent components of the vehicle, for example, at least one of a short-range communication module, wireless communication module, or a wired communication module.

The external device may be a user terminal (not shown) and a remote controller (not shown).

The short-range communication module may include a variety of short-range communication modules that transmit and receive signals in a short distance using a wireless communication network, such as a Bluetooth module, radio frequency identification (RFID) communication module, wireless local access network (WLAN) communication module, near-field communication (NFC) communication module, Zigbee communication module, and the like.

The wired communication module may include various wired communication modules such as a controller area network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wired communication module may further include a local interconnect network (LIN).

The wireless communication module may include wireless communication modules that support a variety of wireless communication methods such as a global system for mobile communication (GSM), code division multiple access (CDMA), wideband CDMA (WCDMA), universal mobile telecommunications system (UMTS), time division multiple access (TDMA), long term evolution (LTE), ultra wideband (UWB), and the like, in addition to a Wifi module and a Wibro module.

According to an exemplary embodiment of the present disclosure, the short-range communication module, wireless communication module, or the wired communication module may include a processor (e.g., computer, microprocessor, CPU, ASIC, circuitry, logic circuits, etc.) and an associated non-transitory memory storing software instructions which, when executed by the processor, provides the functionalities above. Herein, the memory and the processor may be implemented as separate semiconductor circuits. Alternatively, the memory and the processor may be implemented as a single integrated semiconductor circuit. The processor may embody one or more processor(s).

Here, the first side mirror and the second side mirror have been described with reference to FIGS. 1 to 13, a description thereof is omitted herein. The first monitor and the second monitor may be any one of the monitors shown in FIGS. 8, 10, 12, and 13.

The folding member 203 may be provided in each of the first camera 201a of the first side mirror and the second camera 201b of the second side mirror.

The folding member 203 may fold or unfold each of the first camera 201a and the second camera 201b in response to a control command of the processor 122.

The processor 122 may control to fold the first camera 201a and the second camera 201b based on a folding command input to the inputter 108, and control to unfold the first camera 201a and the second camera 201b based on a unfolding command input to the inputter 108.

The processor 122 may control whether to fold or unfold the first camera 201a and the second camera 201b or whether to activate or deactivate the first camera 201a, the second camera 201b, the first monitor 202a and the second monitor 202b, based on at least one of a door unlock signal, a door lock signal, an occupant boarding signal, an occupant exit signal, a door opening signal, a door close signal, or an ignition off signal, which is described in greater detail below.

The processor 122 may determine whether the door unlock signal or the door lock signal is received through the communicator 121.

When it is determined that the door unlock signal is received, the processor 122 may control to unfold the first camera 201a and the second camera 201b, and control to activate the first camera 201a, the second camera 201b, the first monitor 202a and the second monitor 202b.

The processor 122 may determine whether the ignition off signal is received through the inputter 108, and when it is determined that the ignition off signal is received, determine whether a user is in the vehicle based on a detection signal detected by the occupant detector 114.

When it is determined that the user is not in the vehicle, the processor 122 may determine whether a door close signal or a door opening signal is received based on a detection signal detected by the opening/closing detector 113.

When it is determined that the door close signal is received, the processor 122 deactivates the first camera 201a, the second camera 201b, the first monitor 202a and the second monitor 202b.

When it is determined that the user gets in the vehicle after receiving the ignition off signal, the processor 122 maintains activation of the first camera 201a, the second camera 201b, the first monitor 202a and the second monitor 202b.

In a state where the first camera 201a, the second camera 201b, the first monitor 202a and the second monitor 202b are activated after the ignition off signal is received, the processor 122 may receive battery charging state information of the battery 115 from the battery management device 116, and determine whether a charging amount of the battery 115 is less than or equal to a reference charging amount based on the received battery charging state information of the battery 115. When it is determined that the charging amount of the battery 115 is less than or equal to the reference charging amount, the processor 122 may control the display 109 or the speaker 110 to output notification information about battery discharge.

In a state where the first camera 201a, the second camera 201b, the first monitor 202a and the second monitor 202b are activated after the ignition off signal is received, the processor 122 may determine whether a preset period of time elapses from a point in time ('off-time') that the ignition off signal is received. When it is determined that the preset period of time has elapsed, the processor 122 may control the display 109 or the speaker 110 to output notification information about battery discharge.

The processor 122 may maintain activation of the first camera 201a, the second camera 201b, the first monitor 202a and the second monitor 202b, until the preset period of time elapses from the point in time (the off-time).

When controlling to activate the first camera 201a, the second camera 201b, the first monitor 202a and the second monitor 202b in response to receiving the door unlock signal, the processor 122 determines whether the door opening signal is received based on a detection signal detected by the opening/closing detector 113. When it is determined that the door opening signal is received, the processor 122 determines whether the user is in the vehicle based on a detection signal detected by the occupant detector 114, and when it is determined that the user is in the vehicle, may maintain activation of the first camera 201a, the second camera 201b, the first monitor 202a and the second monitor 202b.

After controlling to activate the first camera 201a, the second camera 201b, the first monitor 202a and the second monitor 202b in response to receiving the door unlock signal, when it is determined that the user is not in the vehicle, the processor 122 controls to deactivate the first camera 201a, the second camera 201b, the first monitor 202a and the second monitor 202b. After controlling the deactivation of the first camera 201a, the second camera 201b, the first monitor 202a and the second monitor 202b, when it is determined that the door opening signal is received, the processor 122 may control to activate the first camera 201a, the second camera 201b, the first monitor 202a and the second monitor 202b.

The processor 122 determines whether the door close signal is received through the communicator 121, and when it is determined that the door close signal is received, may control to fold the first camera 201a and the second camera 201b.

As shown in FIG. 15, the processor 122 may predict a distance to an obstacle based on a size and a display position of first and second images obtained by the first and second cameras, respectively, and display the predicted distance on the first monitor and the second monitor.

The processor 122 may obtain an image of user's eyes from the user image obtained by the internal camera 117, and acquire binocular disparity of the user based on the acquired eye image.

When outputting the first and second images obtained by the first and second cameras, respectively, as 3D images, the processor 122 may adjust light paths of a left eye image light and a right eye image light of the first and second images based on the acquired binocular disparity.

The processor 122 perform overall control of driving of the side mirrors of and the vehicle.

The processor 122 may be implemented as a memory (not shown) that stores an algorithm for controlling operations of constituent components of the vehicle and the side mirrors or data about a program that reproduces the algorithm, and a processor (not shown) that performs the above-described operations using the data stored in the memory.

The memory 123 may store information about a reference charging amount, information about a preset time, and information about a distance to an obstacle corresponding to a position and size of an obstacle image in each of the first and second images.

The memory 123 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The memory 123 and the processor 122 may be integrated into one chip, or provided in physically separated locations.

At least one constituent component may be added or omitted corresponding to the performance of the constituent components of the side mirror 200 and the vehicle 1 illustrated in FIG. 14. Also, it will be easily understood by those skilled in the art that mutual positions of the constituent components may be modified corresponding to the performance or structure of the system.

Meanwhile, each of the constituent components illustrated in FIG. 14 may be a software component and/or a hardware component such as field-programmable gate array (FPGA) and application specific integrated circuit (ASIC).

FIG. 16 is a flowchart illustrating vehicle control operations according to further embodiment.

A vehicle may determine whether a door unlock signal or a door lock signal is received through the communicator 121.

When it is determined that the door unlock signal is received (operation 131), the vehicle controls to unfold the first camera 201a and the second camera 201b (operation 132).

The vehicle determines whether a door opening signal is received based on a detection signal detected by the opening/closing detector 113 (operation 133). When it is determined that the door opening signal is received, the vehicle detects an occupant using the occupant detector 114 (operation 134).

The vehicle determines whether an occupant is in the vehicle based on a detection signal detected by the occupant detector 114 (operation 135).

When it is not determined that the occupant is in the vehicle, the vehicle controls to deactivate the first camera 201a, the second camera 201b, the first monitor 202a and the second monitor 202b (operation 136). When it is determined that the occupant is in the vehicle, the vehicle controls to activate the first camera 201a, the second camera 201b, the first monitor 202a and the second monitor 202b (operation 137).

The vehicle displays a first image obtained by the first camera through the first monitor and a second image obtained by the second camera through the second monitor.

The vehicle determines whether an ignition off signal is received through the inputter 108 (operation 138), and when it is determined that the ignition off signal is received, determines whether an occupant gets off the vehicle based on a detection signal detected by the occupant detector 114 (operation 139).

When it is not determined that the occupant is in the vehicle, the vehicle determines whether a door close signal is received based on a detection signal detected by the opening/closing detector 113 (operation 140).

When it is determined that the door close signal is received, the vehicle controls to deactivate the first camera 201a, the second camera 201b, the first monitor 202a and the second monitor 202b (operation 141).

When it is determined that the occupant is still in the vehicle after the ignition off signal is received, the vehicle maintains activation of the first camera 201a, the second camera 201b, the first monitor 202a and the second monitor 202b.

In a state where the first camera 201a, the second camera 201b, the first monitor 202a and the second monitor 202b are activated after the ignition off signal is received, the vehicle receives battery charging state information of the battery 115 from the battery management device 116, and determines whether a charging amount of the battery 115 is less than or equal to a reference charging amount based on the received battery charging state information of the battery 115. When it is determined that the charging amount of the battery 115 is less than or equal to the reference charging amount, the vehicle may output notification information about battery discharge through the display 109 or the speaker 110.

Also, in a state where the first camera 201a, the second camera 201b, the first monitor 202a and the second monitor 202b are activated after the ignition off signal is received, the vehicle determines whether a preset period of time elapses from a point in time ('off-time') that the ignition off signal is received (operation 142). When it is determined that the preset period of time has elapsed, the vehicle may output notification information about battery discharge through the display 109 or the speaker 110 (operation 143).

The vehicle may maintain activation of the first camera 201a, the second camera 201b, the first monitor 202a and the second monitor 202b, until the preset period of time elapses from the point in time (the off-time).

When controlling to deactivate the first camera 201a, the second camera 201b, the first monitor 202a and the second monitor 202b in response to receiving the door close signal, the vehicle determines whether the door unlock signal is received (operation 144), and when it is determined that the door unlock signal is received, the vehicle controls to fold the first camera 201a and the second camera 201b (operation 145).

As is apparent from the above, according to the embodiments of the disclosure, when left and right rear images of a vehicle are displayed, an image with a focal length greater than a distance to a surface of a monitor can be displayed, thereby making the image look less unfamiliar.

According to the embodiments of the disclosure, glare, reflection and inflow of light can be prevented without angling a monitor of a side mirror, and thus a layout of the monitor of the side mirror as well as design freedom can be improved.

According to the embodiments of the disclosure, a difference in focal length between a first image displayed on a first monitor and a second image displayed on a second monitor can be reduced or eliminated.

According to the embodiments of the disclosure, a first monitor and a second monitor can be set up to 0 degree, and thus images displayed on the first and second monitors can be perpendicular to a user's line of sight and minimize a space occupied by the first and second monitors.

According to the embodiments of the disclosure, a marketability and competitiveness of side mirror and vehicle can be enhanced due to improved safety and quality.

Meanwhile, embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:
1. A side mirror, comprising:
   a camera provided on an exterior of a vehicle and configured to obtain an image of a rear environment; and
   a monitor provided inside the vehicle and configured to display the image obtained by the camera, wherein the image displayed on the monitor has a focal length greater than a distance to a surface of the monitor from a user's location,
wherein the monitor comprises:
a housing provided inside the vehicle;
an image source configured to output an image light of the image obtained by the camera;
a first mirror configured to refract and reflect an incident image light, based on the image light output from the image source being incident;
a second mirror on which the image light reflected from the first mirror is incident and configured to expand and reflect the incident image light;
a glass panel configured to project the image light reflected from the second mirror; and
a coating part provided on one side of the glass panel and configured to prevent optical interference.

2. The side mirror of claim 1, wherein the image source is configured to output a two-dimensional (2D) image or a three-dimensional (3D) image.

3. The side mirror of claim 1, wherein the image obtained by the camera is a 3D image,
the image source of the monitor comprises a light field display, and the light field display comprises a color filter configured to output the 3D image obtained by the camera, and an optical member configured to separate the 3D image output from the color filter into a left eye image light and a right eye image light and output in different directions.

4. The side mirror of claim 3, wherein the optical member comprises at least one of a barrier, a lenticular lens, a microlens array, a grating or a pinhole.

5. The side mirror of claim 1, wherein the image source comprises a hologram display, and
the hologram display comprises a multi-directional backlight units (MDBUs), a liquid crystal display (LCD) panel, a holographic functional screen (HFS), and a lenticular lens array (LLA).

6. The side mirror of claim 1, wherein the image obtained by the camera is a 3D image,
the image source comprises a floating display, and the floating display comprises a display configured to output the 3D image obtained by the camera, a first HoloLens configured to adjust a light path of a left eye image of the 3D image, and a second HoloLens configured to adjust a light path of a right eye image of the 3D image.

7. The side mirror of claim 1, wherein the monitor comprises:
a housing provided inside the vehicle;
an image source configured to output an image light of the image obtained by the camera;
an optical member configured to reflect the image light output from the image source inside, and then output to an outside; and a coating part provided on one side of the optical member and configured to prevent optical interference.

8. The side mirror of claim 7, wherein the image obtained by the camera is a 3D image, and the image source is one of a light field display, a hologram display or a floating display.

9. The side mirror of claim 1, wherein the image obtained by the camera is a 3D image, and
the monitor comprises:
an image source configured to output a left eye image light and a right eye image light of the image obtained by the camera;
a waveguide plate comprising a first HoloLens configured to adjust a light path of the left eye image light, and a second HoloLens configured to adjust a light path of the right eye image light; and a coating part provided on one side of the waveguide plate and configured to prevent optical interference.

10. A vehicle, comprising:
a first camera configured to obtain a first image of a rear left environment;
a first monitor configured to display the first image obtained by the first camera;
a second camera configured to obtain a second image of a rear right environment; and
a second monitor configured to display the second image obtained by the second camera,
wherein the first image displayed on the first monitor has a focal length greater than a distance to a surface of the first monitor from a user's location, and the second image displayed on the second monitor has a focal length greater than a distance to a surface of the second monitor from the user's location,
wherein the first monitor comprises:
a housing provided inside the vehicle;
an image source provided inside the housing and configured to output an image light of the first image obtained by the first camera;
a first mirror provided inside the housing and configured to refract and reflect an incident image light, based on the image light output from the image source being incident;
a second mirror on which the image light reflected from the first mirror is incident and configured to expand and reflect the incident image light, the second mirror being provided inside the housing;
a glass panel provided outside the housing and configured to project the image light reflected from the second mirror; and
a coating part provided on one side of the glass panel and inside the housing and configured to prevent optical interference.

11. The vehicle of claim 10, wherein the first monitor is provided inside a first A pillar provided on a left interior of the vehicle, and the second monitor is provided inside a second A pillar provided on a right interior of the vehicle.

12. The vehicle of claim 1, wherein the first image obtained by the first camera is a 3D image, and
the first monitor comprises one of a light field display, a hologram display or a floating display.

13. The vehicle of claim 10, wherein the first monitor comprises:
a housing provided inside the vehicle;
an image source configured to output an image light of the first image obtained by the first camera;
an optical member configured to reflect the image light output from the image source inside, and then output to an outside; and a coating part provided on one side of the optical member and configured to prevent optical interference.

14. The vehicle of claim 10, wherein the first image obtained by the first camera is a 3D image, and the first monitor comprises:
an image source configured to output a left eye image light and a right eye image light of the 3D image obtained by the first camera, a waveguide plate comprising a first HoloLens configured to adjust a light path of the left eye image light, and a second HoloLens configured to adjust a light path of the right eye image light; and a coating part provided on one side of the waveguide plate and configured to prevent optical interference.

15. A vehicle, comprising:

a first camera provided outside the vehicle and configured to obtain a first image of a rear left environment of the vehicle;

a first monitor provided inside the vehicle and configured to display the first image obtained by the first camera;

a second camera provided outside the vehicle and configured to obtain a second image of a rear right environment of the vehicle; and a second monitor provided inside the vehicle and configured to display the second image obtained by the second camera, wherein the first image displayed on the first monitor has a focal length greater than a distance to a surface of the first monitor from a user's location, and the second image displayed on the second monitor has a focal length greater than a distance to a surface of the second monitor from the user's location, wherein each of the first monitor and the second monitor comprises:

a housing;

an image source provided inside the housing and configured to output an image light of the first image obtained by the first camera, or the second image obtained by the second camera;

a first mirror provided inside the housing and configured to refract and reflect an incident image light, based on the image light output from the image source being incident;

a second mirror on which the image light reflected from the first mirror is incident and configured to expand and reflect the incident image light, the second mirror being provided inside the housing;

a glass panel provided outside the housing and configured to project the image light reflected from the second mirror; and a coating part provided on one side of the glass panel and inside the housing and configured to prevent optical interference.

16. The vehicle of claim 15, wherein the first image obtained by the first camera and the second image obtained by the second camera are 3D images, and each of the first monitor and the second monitor comprises one of a light field display, a hologram display or a floating display.

17. The vehicle of claim 15, wherein each of the first monitor and the second monitor comprises:

an image source configured to output an image light of the first image obtained by the first camera, or the second image obtained by the second camera, an optical member configured to reflect the image light output from the image source inside, and then output to an outside, and a coating part provided on one side of the optical member and configured to prevent optical interference.

18. The vehicle of claim 15, wherein the first image obtained by the first camera and the second image obtained by the second camera are 3D images, and each of the first monitor and the second monitor comprises:

an image source configured to output a left eye image light and a right eye image light of a first 3D image obtained by the first camera or a second 3D image obtained by the second camera, a waveguide plate comprising a first HoloLens configured to adjust a light path of the left eye image light, and a second HoloLens configured to adjust a light path of the right eye image light, and a coating part provided on one side of the waveguide plate and configured to prevent optical interference.

* * * * *